(12) United States Patent
Ishii et al.

(10) Patent No.: US 8,493,527 B2
(45) Date of Patent: Jul. 23, 2013

(54) LIQUID CRYSTAL PANEL AND LIQUID CRYSTAL DISPLAY APPARATUS

(75) Inventors: Takaaki Ishii, Osaka (JP); Masatsugu Higashi, Osaka (JP); Nao Murakami, Osaka (JP)

(73) Assignee: Nitto Denko Corporation, Osaka (JP)

( * ) Notice: Subject to any disclaimer, the term of this patent is extended or adjusted under 35 U.S.C. 154(b) by 407 days.

(21) Appl. No.: 12/489,629

(22) Filed: Jun. 23, 2009

(65) Prior Publication Data
US 2009/0316086 A1   Dec. 24, 2009

(30) Foreign Application Priority Data

Jun. 24, 2008  (JP) .................................. 2008-164000
Jun. 16, 2009  (JP) .................................. 2009-143027

(51) Int. Cl.
 *G02F 1/1335*  (2006.01)
(52) U.S. Cl.
 USPC .............................. 349/96; 349/117; 349/118
(58) Field of Classification Search
 USPC ........................................... 349/96, 117–118
 See application file for complete search history.

(56) References Cited

U.S. PATENT DOCUMENTS

| | | | |
|---|---|---|---|
| 6,094,245 A | 7/2000 | Ochi et al. | |
| 6,628,359 B1 | 9/2003 | Terashita et al. | |
| 7,012,663 B2 | 3/2006 | Ono et al. | |
| 7,812,901 B2 | 10/2010 | Kinjo et al. | |
| 7,864,268 B2 | 1/2011 | Egi et al. | |
| 8,031,296 B2 | 10/2011 | Maezawa et al. | |
| 2004/0051831 A1* | 3/2004 | Su Yu et al. | 349/117 |
| 2004/0239852 A1 | 12/2004 | Ono et al. | |
| 2006/0176422 A1* | 8/2006 | Jeng et al. | 349/96 |
| 2007/0200977 A1 | 8/2007 | Egi et al. | |
| 2008/0007680 A1* | 1/2008 | Kitagawa et al. | 349/118 |

(Continued)

FOREIGN PATENT DOCUMENTS

| | | |
|---|---|---|
| JP | 10-133196 A | 5/1998 |
| JP | 2001-228310 A | 8/2001 |

(Continued)

OTHER PUBLICATIONS

Japanese Office Action dated Nov. 21, 2012, issued in corresponding Japanese Patent Application No. 2009-143027, (8 pages). With English Translation.

(Continued)

*Primary Examiner* — Nathanael R Briggs
(74) *Attorney, Agent, or Firm* — Westerman, Hattori, Daniels & Adrian, LLP

(57) ABSTRACT

The liquid crystal panel according to an embodiment of the present invention includes a liquid crystal cell, a first polarizing plate placed on one side of the liquid crystal cell, a second polarizing plate and a third polarizing plate placed on the other side of the liquid crystal cell in an order starting from a side of the liquid crystal cell, and a retardation plate (A) placed between the liquid crystal cell and the second polarizing plate, wherein a refractive index ellipsoid of the retardation plate (A) has a relationship of $nx \geq ny > nz$, a difference ($\Delta T_{2-1} = T_2 - T_1$) between a transmittance ($T_2$) of the second polarizing plate and a transmittance ($T_1$) of the first polarizing plate is larger than 0%, a difference ($\Delta T_{3-2} = T_3 - T_2$) between a transmittance ($T_3$) of the third polarizing plate and a transmittance ($T_2$) of the second polarizing plate is 4.0% to 7.5%, and the third polarizing plate is a linearly polarized light separation type reflective polarizing plate.

14 Claims, 5 Drawing Sheets

U.S. PATENT DOCUMENTS

| | | | |
|---|---|---|---|
| 2008/0018833 A1* | 1/2008 | Ma | 349/98 |
| 2010/0141873 A1 | 6/2010 | Kinjo et al. | |
| 2010/0182546 A1 | 7/2010 | Maezawa et al. | |
| 2011/0063545 A1 | 3/2011 | Egi et al. | |

FOREIGN PATENT DOCUMENTS

| | | | |
|---|---|---|---|
| JP | 2004-227006 A | | 8/2004 |
| JP | 3648240 B2 | | 5/2005 |
| JP | 2006091369 A | * | 4/2006 |
| JP | 2007-256936 A | | 10/2007 |
| JP | 2007-298958 A | | 11/2007 |
| JP | 2008-9388 A | | 1/2008 |

OTHER PUBLICATIONS

Third Party Observation dated Mar. 12, 2013, issued in corresponding Japanese Patent Application No. 2009-143027, w/ English translation.

* cited by examiner slow axis slow axis

LIQUID CRYSTAL PANEL AND LIQUID CRYSTAL DISPLAY APPARATUS

This application claims priority under 35 U.S.C. Section 119 to Japanese Patent Application Nos. 2008-164000 filed on Jun. 24, 2008, and 2009-143027 filed on Jun. 16, 2009, which are herein incorporated by references.

BACKGROUND OF THE INVENTION

1. Field of the Invention

The present invention relates to a liquid crystal panel and a liquid crystal display apparatus having excellent contrast properties.

2. Description of Related Art

A liquid crystal display apparatus (hereinafter, referred to as an LCD) displays characters and images, using the electrooptical characteristics of liquid crystal molecules. The LCD generally uses a liquid crystal panel in which polarizing plates are placed on both sides of a liquid crystal cell, and can display a black image under no voltage application in a normally black mode, for example. The LCD has a problem in that a contrast ratio in front and oblique directions is low. In order to solve this problem, a liquid crystal panel using a retardation film has been disclosed (for example, see JP 3648240 B). However, the further increase in performance of the LCD is desired on the market, and as one example, there is a demand for a liquid crystal display apparatus exhibiting a higher contrast ratio, capable of outputting characters and images clearly.

Further, although it is known to enhance the brightness of a liquid crystal display apparatus using a reflective polarizing plate for the purpose of enhancing display properties of the liquid crystal display apparatus, the enhancement of a contrast using the reflective polarizing plate has not been realized.

SUMMARY OF THE INVENTION

It is an object of the present invention to provide a liquid crystal display panel and a liquid crystal display apparatus having a high contrast ratio in a front direction.

The present inventors have conducted intensive studies for solving the above problems, and have found that the above objects can be attained with the liquid crystal panel described below, to thereby complete the present invention.

A liquid crystal panel according to an embodiment of the present invention includes a liquid crystal cell, a first polarizing plate placed on one side of the liquid crystal cell, a second polarizing plate and a third polarizing plate placed on the other side of the liquid crystal cell in an order starting from a side of the liquid crystal cell, and a retardation plate (A) placed between the liquid crystal cell and the second polarizing plate, wherein a refractive index ellipsoid of the retardation plate (A) has a relationship of nx≧ny>nz, a difference $(\Delta T_{2-1}=T_2-T_1)$ between a transmittance $(T_2)$ of the second polarizing plate and a transmittance $(T_1)$ of the first polarizing plate is larger than 0%, a difference $(\Delta T_{3-2}=T_3-T_2)$ between a transmittance $(T_3)$ of the third polarizing plate and a transmittance $(T_2)$ of the second polarizing plate is 4.0% to 7.5%, and the third polarizing plate is a linearly polarized light separation type reflective polarizing plate.

In a preferred embodiment of the present invention, the liquid crystal panel further comprising another retardation plate (B) whose refractive index ellipsoid has a relationship of nx≧ny>nz between the liquid crystal cell and the first polarizing plate.

In a preferred embodiment of the present invention, the difference $(\Delta T_{2-1}=T_2-T_1)$ between a transmittance $(T_2)$ of the second polarizing plate and a transmittance $(T_1)$ of the first polarizing plate is 0.1% to 4.0%.

In a preferred embodiment of the present invention, the difference $(\Delta T_{3-2}=T_3-T_2)$ between a transmittance $(T_3)$ of the third polarizing plate and a transmittance $(T_2)$ of the second polarizing plate is 4.0% to 7.0%.

In a preferred embodiment of the present invention, a difference $(\Delta T_{3-1}=T_3-T_1)$ between a transmittance $(T_3)$ of the third polarizing plate and a transmittance $(T_1)$ of the first polarizing plate is 5.5% to 8.0%.

In a preferred embodiment of the present invention, the first polarizing plate is placed on a viewer side of the liquid crystal cell, and the second polarizing plate and the third polarizing plate are placed on an opposite side of the liquid crystal cell with respect to the viewer side In a preferred embodiment of the present invention, the first polarizing plate includes a first polarizer, the second polarizing plate includes a second polarizer, the third polarizing plate includes a third polarizer, and a transmission axis of the second polarizer and a transmission axis of the third polarizer are substantially parallel to each other.

In a preferred embodiment of the present invention, a slow axis of the retardation plate (A) and an absorption axis of the second polarizer are substantially perpendicular to each other.

In a preferred embodiment of the present invention, the liquid crystal cell includes liquid crystal molecules arranged in a homeotropic alignment.

In a preferred embodiment of the present invention, a thickness direction retardation value (Rth[590]) at a wavelength of 590 nm of the retardation plate (A) is 100 nm to 400 nm.

In a preferred embodiment of the present invention, an Nz coefficient of the retardation plate (A) is more than 1.1 and equal to or less than 8.

In a preferred embodiment of the present invention, the retardation plate (A) contains one of a polyimide-based resin, a norbornene-based resin, a cellulose-based resin, a polycarbonate-based resin, a polypropylene-based resin, an acrylic resin, a polyvinyl acetal-based resin, and a polyester-based resin.

According to another aspect of the present invention, a liquid crystal display apparatus is provided. The liquid crystal display apparatus of the present invention includes the liquid crystal panel of the present invention.

The liquid crystal display apparatus including the liquid crystal panel of the present invention uses two polarizing plates with a transmittance adjusted and a retardation plate, and further uses a linearly polarized light separation type reflective polarizing plate as a third polarizing plate, thereby exhibiting excellent display properties in which a contrast ratio in a front direction is remarkably higher than that of a liquid crystal display apparatus including a conventional liquid crystal panel.

DETAILED DESCRIPTION OF THE PREFERRED EMBODIMENTS

<Definition of Terms and Symbols>

The definition of the terms and symbols in the specification of the present invention are as follows.

(1) Light Transmittance of Polarizing Plate

A light transmittances (T) of a polarizing plate refers to a Y value obtained through visibility correction by a two-degree field of view (C light source) in accordance with JIS Z 8701-1982.

(2) Refractive Index (nx, ny and nz)

"nx" represents a refractive index in a direction in which an in-plane refractive index becomes maximum (i.e., in a slow axis direction), "ny" represents a refractive index in a direction perpendicular to the slow axis in the same plane (i.e., in a fast axis direction), and "nz" represents a refractive index in a thickness direction.

(3) In-Plane Retardation Value

An in-plane retardation value ($Re[\lambda]$) refers to an in-plane retardation value of a film at a wavelength $\lambda$ (nm) at 23° C. $Re[\lambda]$ is obtained by $Re[\lambda]=(nx-ny)\times d$ where the thickness of the film is d (nm).

(4) Thickness Direction Retardation Value

A thickness direction retardation value ($Rth[\lambda]$) refers to a retardation value in a film thickness direction at a wavelength $\lambda$ (nm) at 23° C. $Rth[\lambda]$ is obtained by $Rth[\lambda]=(nx-nz)\times d$ where the thickness of the film is d (nm).

(5) Birefringence in Thickness Direction

A birefringence ($\Delta n_{xz}[\lambda]$) in a thickness direction is obtained by $\Delta n_{xz}[\lambda]=Rth[\lambda]/d$.

(6) Nz Coefficient

An Nz coefficient is obtained by $Nz=Rth[590]/Re[590]$.

(7) In the specification of the present invention, the phrase "nx=ny" or "ny=nz" not only refers to a case where they are completely equal but also includes a case where they are substantially equal. Therefore, for example, the phrase "nx=ny" includes a case where Re[590] is less than 10 nm.

(8) In the specification of the present invention, the phrase "substantially perpendicular" includes a case where an angle formed by two optical axes is 90°±2.0°, and preferably 90°±1.0°. The phrase "substantially parallel" includes a case where an angle formed by two optical axes is 0°±2.0°, and preferably 0°±1.0°.

<A. Outline of Liquid Crystal Panel>

Figure 1:
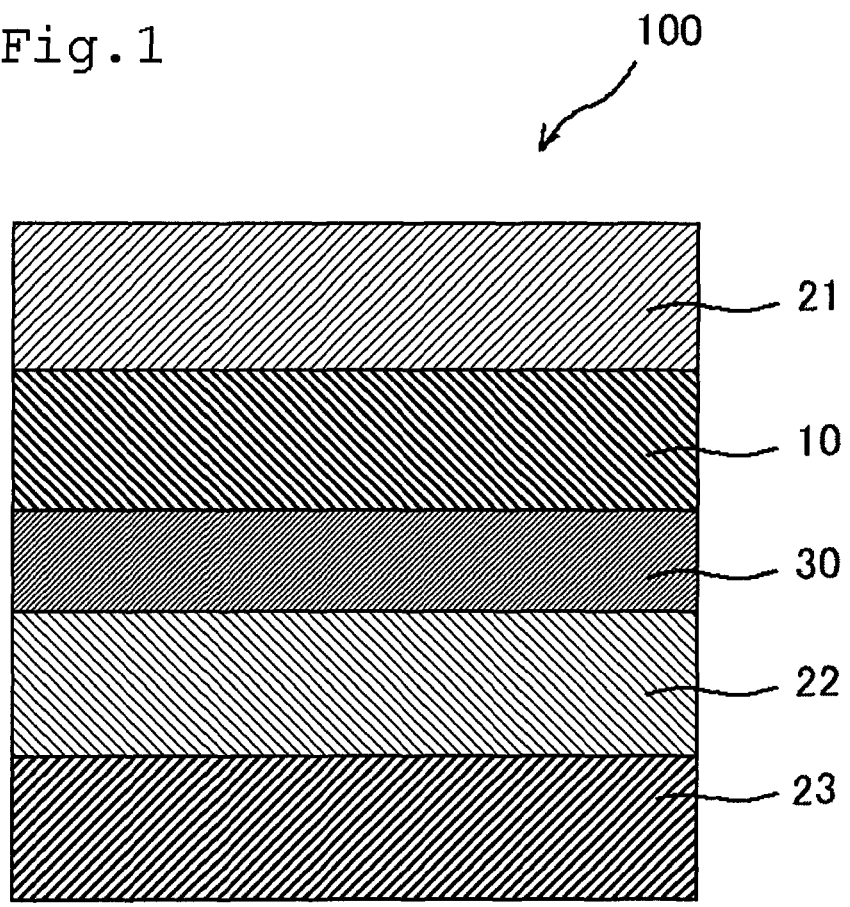
FIG. 1 is a schematic cross-sectional view of a liquid crystal panel according to a preferred embodiment of the present invention.

FIG. 1 is a schematic cross-sectional view of a liquid crystal panel according to a preferred embodiment of the present invention. A liquid crystal panel 100 includes a liquid crystal cell 10, a first polarizing plate 21 placed on one side of the liquid crystal cell 10, a second polarizing plate 22 and a third polarizing plate 23 placed in an order starting from the liquid crystal cell 10 on the other side of the liquid crystal cell 10, and a retardation plate (A) 30 placed between the liquid crystal cell 10 and the second polarization plate 22. Practically, any adhesion layer and/or another optical member (not shown) is placed between the liquid crystal cell 10 and the first polarizing plate 21, and between the liquid crystal cell 10 and the third polarizing plate 23.

Preferably, the first polarizing plate is placed on a viewer side of the liquid crystal cell, and the second polarizing plate and the third polarizing plate are placed on an opposite side of the liquid crystal cell with respect to the viewer side (backlight side). This is because, by placing the second polarizing plate and the third polarizing plate both with a large transmittance on the backlight side, light can be incident in a greater amount upon the liquid crystal cell, and a high brightness (brightness in a white display) is obtained when a white image display and a color display are performed. On the other hand, by placing a polarizing plate with a small transmittance on the viewer side, thereby making the amount of light from a backlight leak to the viewer side as small as possible, a brightness (brightness in a black display) can be suppressed to be low when a black image is displayed. As a result, a liquid crystal display apparatus with a high contrast ratio can be obtained.

Preferably, the first polarizing plate includes a first polarizer, the second polarizing plate includes a second polarizer, the third polarizing plate includes a third polarizer, and an absorption axis of the first polarizer is substantially perpendicular to an absorption axis of the second polarizer.

Preferably, a transmission axis of the second polarizer and a transmission axis of the third polarizer are substantially parallel to each other. In such an arrangement, only a light component in one direction can be incident upon a liquid crystal cell in a greater amount, and hence, a liquid crystal display apparatus with a high contrast ratio can be obtained. More preferably, the transmission axis of the second polarizer and the transmission axis of the third polarizer are substantially parallel to each other, and an absorption axis of the second polarizer and a slow axis of the retardation plate (A) are substantially perpendicular to each other.

Figure 2:
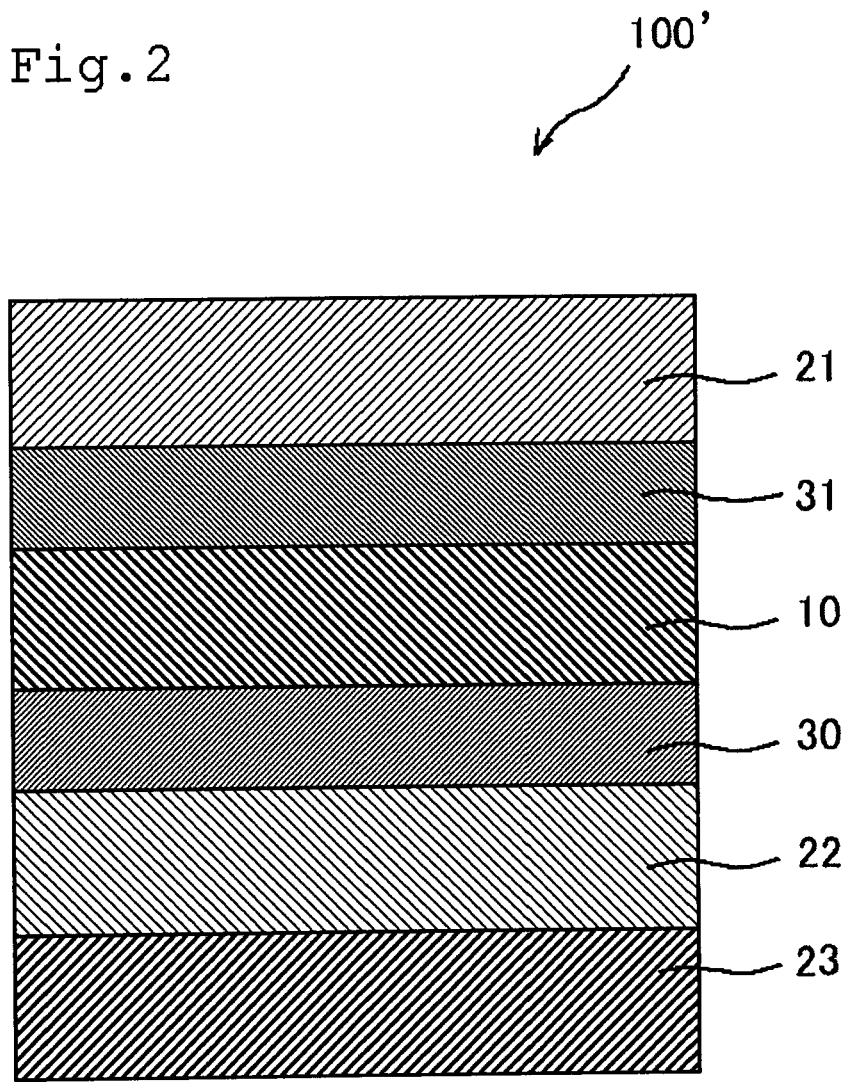
FIG. 2 is a schematic cross-sectional view of a liquid crystal panel according to another preferred embodiment of the present invention.

FIG. 2 is a schematic cross-sectional view of a liquid crystal panel in another preferred embodiment of the present invention. A liquid crystal panel 100' further includes another retardation plate (B) 31 placed between a liquid crystal cell 10 and a first polarizing plate 21.

Preferably, the slow axis of the another retardation plate (B) is substantially perpendicular to the absorption axis of the first polarizer.

A transmittance ($T_2$) of the second polarizing plate is larger than a transmittance ($T_1$) of the first polarizing plate. A difference ($\Delta T_{2-1}=T_2-T_1$) between the transmittance ($T_2$) of the second polarizing plate and the transmittance ($T_1$) of the first polarizing plate is larger than 0%, preferably 0.1% to 4.0%, more preferably 0.1% to 3.0%, and particularly preferably 0.2% to 2.0%. By using the first and second polarizing plates having a transmittance difference in the above ranges, a liquid crystal panel with a higher contrast ratio in a front direction can be obtained.

A difference ($\Delta T_{3-2}=T_3-T_2$) between a transmittance ($T_3$) of the third polarizing plate and a transmittance ($T_2$) of the second polarizing plate is 4.0% to 7.5%, and preferably 4.0% to 7.0%. By using the third and second polarizing plates having a transmittance difference in the above ranges, a liquid crystal panel with much higher contrast ratio in a front direction can be obtained.

A difference ($\Delta T_{3-1}=T_3-T_1$) between the transmittance ($T_3$) of the third polarizing plate and the transmittance ($T_1$) of the first polarizing plate is preferably 5.5% to 8.0%, and more preferably 5.5% to 7.5%. By using the third and first polarizing plates with a transmittance difference in the above ranges, a liquid crystal panel with much higher contrast ratio in a front direction can be obtained.

The liquid crystal panel is preferably in a normally black mode. In the specification of the present invention, the term "normally black mode" refers to a liquid crystal panel in which a light transmittance becomes minimum (a screen becomes dark) under no voltage application, and the light transmittance increases under voltage application. The effect of enhancing a contrast ratio in a front direction is particularly remarkable in a liquid crystal panel in a normally black mode, which performs a black display under no voltage application. It is considered that the effect obtained by using the first polarizing plate, the second polarizing plate and the third polarizing plate is not inhibited by the driving of liquid crystal molecules.

<B. Liquid Crystal Cell>

As the liquid crystal cell used in the present invention, any suitable one can be adopted. Examples of the above liquid crystal cell include an active matrix type using a thin film transistor and a simple matrix type adopted in a super-twisted nematic liquid crystal display apparatus.

The liquid crystal cell preferably includes a pair of substrates and a liquid crystal layer as a display medium placed between the pair of substrates. On one substrate (active matrix substrate), switching elements (typically, TFTs) for controlling the electrooptical characteristics of liquid crystal, and scanning lines that provide a gate signal to the switching elements and signal lines that provide a source signal to the switching elements are provided. On the other substrate (color filter substrate), a color filter is provided.

The color filter may be provided on the active matrix substrate. Alternatively, in the case where an RGB 3-color light source (which may further include a multi-color light source) is used for illumination means of a liquid crystal display apparatus as in a field sequential system, the above-mentioned color filter can be omitted. The interval between two substrates is controlled with spacers. On a side of each substrate, which is in contact with a liquid crystal layer, an alignment film made of, for example, polyimide is provided. Alternatively, for example, in the case where the initial alignment of liquid crystal molecules is controlled using a fringe electric field formed by a patterned transparent electrode, the alignment film can be omitted.

The liquid crystal cell preferably contains liquid crystal molecules arranged in a homeotropic alignment. In the specification of the present invention, the term "homeotropic alignment" refers to the state in which an alignment vector of liquid crystal molecules is aligned vertically (in a normal direction) with respect to the plane of a substrate as a result of the interaction between the substrate subjected to an alignment treatment and liquid crystal molecules. The homeotropic alignment also includes the case where the alignment vector of liquid crystal molecules is slightly inclined with respect to the direction normal to a substrate, i.e., the case where liquid crystal molecules have a pretilt. In the case where liquid crystal molecules have a pretilt, the pretilt angle (angle from the normal line of the substrate) is preferably 5° or less. By setting the pretilt angle in the above range, a liquid crystal display apparatus with a high contrast ratio can be obtained.

Examples of the driving mode of a liquid crystal cell include a vertical alignment (VA) mode, a twisted nematic (TN) mode, an in-plane switching (IPS) mode, a vertical alignment type electric field control birefringence (ECB) mode, and an optical compensation birefringence (OCB) mode. Preferably, the liquid crystal cell is in a vertical alignment (VA) mode.

The liquid crystal cell of a VA mode allows liquid crystal molecules arranged in a homeotropic alignment in the absence of an electric field to respond with an electric field in a direction normal to a substrate, using a voltage control birefringence effect. Specifically, for example, as described in JP 62-210423 A and JP 04-153621 A, in the case of a normally black mode, liquid crystal molecules are arranged in a direction normal to a substrate in the absence of an electric field, so a black display is obtained when upper and lower polarizing plates are placed such that the respective absorption axes are perpendicular to each other. On the other hand, under electric field application, liquid crystal molecules are operated so as to be tilted at an azimuth of 45° with respect to an absorption axis of a polarizing plate, whereby a light transmittance increases to obtain a white display.

The liquid crystal cell of a VA mode may be set to be a multi-domain by using an electrode with a slit or a base material with protrusions formed on its surface, as described in JP 11-258605 A, for example. Examples of such a liquid crystal cell include an ASV (Advanced Super View) mode manufactured by Sharp Corporation, a CPA (Continuous Pinwheel Alignment) mode manufactured by Sharp Corporation, a MVA (Multi-domain Vertical Alignment) mode manufactured by Fujitsu Ltd., a PVA (Patterned Vertical Alignment) mode manufactured by Samsung Electronics Co., Ltd., an EVA (Enhanced Vertical Alignment) mode manufactured by Samsung Electronics Co., Ltd., and SURVIVAL (Super Ranged Viewing by Vertical Alignment) mode manufactured by Sanyo Electric Co., Ltd.

$Rth_{LC}[590]$ under no electric field application of the liquid crystal cell is preferably −500 nm to −200 nm, and more preferably −400 nm to −200 nm. The above $Rth_{LC}[590]$ is appropriately set based on the birefringence of liquid crystal molecules and a cell gap. The cell gap (substrate interval) of the liquid crystal cell is generally 1.0 µm to 7.0 µm.

As the liquid crystal cell, the one mounted on a commercially available liquid crystal display apparatus may be used as it is. Examples of the commercially available liquid crystal display apparatuses including a liquid crystal cell of a VA mode include a liquid crystal television "AQUOS series" (trade name) manufactured by Sharp Corporation, a liquid crystal television "BRAVIA series" (trade name) manufactured by Sony Corporation, a 32V-type wide liquid crystal television "LN32R51B" (trade name) manufactured by SUMSUNG, a liquid crystal television "FORIS SC26XD1" (trade name) manufactured by NANAO Corporation, and a liquid crystal television "T460HW01" (trade name) manufactured by AU Optronics.

<C. Polarizing Plate>

The first polarizing plate, the second polarizing plate and third polarizing plate used in the present invention, any suitable polarizing plates can be adopted as long as a light transmittance satisfies the above relationship. In the specification of the present invention, the term "polarizing plate" refers to the one that converts natural light or polarized light into linearly polarized light. Preferably, the polarizing plate has a function of separating incident light into two polarized light components whose polarization directions are perpendicular to each other, and transmits one polarized light component and absorbs, reflects, and/or scatters the other polarized light component.

The polarizing plate may be a single layer (which may also be referred to as a polarizer) having a polarization function, or may be a laminate composed of a plurality of layers. In the case where the polarizing plate is a laminate, examples of the configuration include (a) a laminate (e.g., a configuration of each of a first polarizing plate and a second polarizing plate in an example) including a polarizer and a protective layer, (b) a laminate including a polarizer, a protective layer, and a surface treatment layer, (c) a laminate including at least two layers of polarizers, (d) a laminate including a polarizer and a resin layer, (e) a laminate including a polarizer, a resin layer, and a diffusion layer. The polarizing plate may have two or more surface treatment layers and/or resin layers.

The thickness of the polarizing plate is not particularly limited, and includes a general concept of a thin film, a film, and a sheet. The thickness of the first and second polarizing plate are generally 1 µm to 250 µm, and preferably 20 µm to 250 µm. The thickness of third polarizing plate is generally 1 µm to 250 µm, and preferably 50 µm to 200 µm. By setting the thickness of the polarizing plate in the above range, a polarizing plate with excellent mechanical strength can be obtained.

The light transmittance ($T_1$) of the first polarizing plate is preferably 39.0% to 44.0%, more preferably 40.0% to 43.0%, and particularly preferably 40.5% to 42.5%. By setting $T_1$ in the above range, a liquid crystal display apparatus with much higher contrast ratio in a front direction can be obtained.

The light transmittance ($T_2$) of the second polarizing plate is preferably 40.0% to 45.0%, more preferably 41.0% to 44.0%, and particularly preferably 41.0% to 43.5%. By setting $T_2$ in the above range, a liquid crystal display apparatus with much higher contrast ratio in a front direction can be obtained.

The light transmittance ($T_3$) of the third polarizing plate is preferably 45.5% to 49.9%, and more preferably 46.0% to 49.0%. By setting $T_3$ in the above range, a liquid crystal display apparatus with much higher contrast ratio in a front direction can be obtained.

The first polarizing plate and the second polarizing plate can be obtained, for example, by selecting polarizing plates which have different transmittances among those which are commercially available and combining them appropriately. Preferably, the liquid crystal panel of the present invention is produced by appropriately adjusting the transmittances of polarizing plates so that a contrast ratio in a front direction is enhanced in accordance with the driving mode, the applications of the liquid crystal panel, and the like of a liquid crystal cell.

As a method of increasing or decreasing the light transmittance of the first and second polarizing plate, for example, in the case where a polarizer mainly containing a polyvinyl alcohol-based resin containing iodine is used, there is a method of adjusting the content of iodine in the polarizer. Specifically, when the content of iodine in the polarizer is increased, the light transmittance of the polarizing plate can be decreased. When the content of iodine in the polarizer is decreased, the light transmittance of the polarizing plate can be increased. This method is also applicable for producing a roll-shaped polarizing plate and a sheet-shaped polarizing plate. The details of the polarizer will be described later.

The degree of polarization (P) of the first and second polarizing plate is preferably 99% or more, more preferably 99.5% or more, and much more preferably 99.8% or more. By setting the degree of polarization (P) in the above range, a liquid crystal display apparatus with much higher contrast ratio in a front direction can be obtained.

The degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizing plate; and using the following equation: degree of polarization (%)=$\{(H_0-H_{90})/(H_0+H_{90})\}^{1/2} \times 100$. The parallel light transmittance ($H_0$) refers to a light transmittance of a parallel laminate polarizing plate produced by piling two identical polarizing plates such that respective absorption axes are parallel to each other. The perpendicular light transmittance ($H_{90}$) refers to a light transmittance of a perpendicular laminate polarizing plate produced by piling two identical polarizing plates such that respective absorption axes are perpendicular to each other. Those light transmittances refer to a Y value obtained through visibility correction by a two-degree field of view (C light source) in accordance with JIS Z8701-1982.

The third polarizing plate is a linearly polarized light separation type polarizing plate. Typical examples of the linearly polarized light separation type polarizing plate include a polarizing plate having a grid-type polarizer, a multi-layered thin film laminate including at least two layers of at least two kinds of materials having different refractive indices, a vapor-deposited multi-layered thin film having different refractive indices used in a beam splitter or the like, a birefringence layer multi-layered thin film laminate including at least two layers of at least two kinds of materials having different refractive indices, a stretched resin laminate including at least two layers of at least two kinds of resins having different refractive indices, and a polarizing plate that separates linearly polarized light by allowing linearly polarized light to reflect/transmit in a perpendicular axial direction. A preferred example thereof includes a polarizing plate (linearly polarized light separation type reflective polarizing plate) that separates linearly polarized light by allowing linearly polarized light to reflect/transmit in a perpendicular axial direction. If the linearly polarized light separation type reflective polarizing plate is used as the third polarizing plate, and the third polarizing plate and the second polarizing plate with the above-mentioned transmittance are combined, only a light component in one direction can be incident in a greater amount upon a liquid crystal cell, and a higher brightness (white brightness) can be obtained when a white image display and a color display are performed.

Any linearly polarized light separation type reflective polarizing plate can be appropriately employed as long as the linearly polarized light separation type reflective polarizing plate has a function of separating linearly polarized light from natural light by allowing linearly polarized light to reflect/transmit in a perpendicular axial direction. For example, a multilayer laminate obtained by laminating alternately a material exhibiting retardation through stretching (such as polyethylene naphthalate, polyethylene terephthalate, or polycarbonate) or an acrylic resin (such as polymethyl methacrylate), and a resin having suppressed the exhibition level of retardation (such as a norbornene-based resin "Arton" available from JSR Corporation) may be uniaxially stretched and used. The linearly polarized light separation type reflective polarizing plate is commercially available, for example, as "NIPOCS APCF" (trade name) manufactured by Nitto Denko Corporation, and "DBEF" (trade name) manufactured by 3M Company.

<C-1. Polarizer>

As the polarizer used in the present invention, any suitable one can be adopted. Preferably, the first polarizing plate includes a first polarizer, the second polarizing plate includes a second polarizer, and each of the first polarizer and the second polarizer contains as a main component a polyvinyl alcohol-based resin with iodine. The polarizer can generally be obtained by stretching a polymer film containing as a main component a polyvinyl alcohol-based resin with iodine. A polarizing plate including such a polarizer has excellent optical properties.

The relationship between the iodine content ($I_1$) of the first polarizer and the iodine content ($I_2$) of the second polarizer is preferably $I_1>I_2$. The difference ($\Delta I=I_1-I_2$) between the iodine content ($I_1$) of the first polarizer and the iodine content ($I_2$) of the second polarizer is preferably 0.1% by weight to 2.6% by weight, more preferably 0.1% by weight to 2.0% by weight, particularly preferably 0.1% by weight to 1.4% by weight, and most preferably 0.12% by weight to 0.8% by weight. By setting the relationship of the iodine contents of the respective polarizers in the above range, a polarizing plate having a light transmittance relationship in a preferred range is obtained, whereby a liquid crystal display apparatus with high contrast ratio in a front direction can be obtained.

The iodine content of each of the first polarizer and the second polarizer is preferably 1.8% by weight to 5.0% by weight, and more preferably 2.0% by weight to 4.0% by weight. The iodine content of the first polarizer is preferably 2.3% by weight to 5.0% by weight, more preferably 2.5% by weight to 4.5% by weight, and particularly preferably 2.5% by weight to 4.0% by weight. The iodine content of the second polarizer is preferably 1.8% by weight to 3.5% by weight, more preferably 1.9% by weight to 3.2% by weight, and particularly preferably 2.0% by weight to 3.1% by weight. By setting the iodine content of each polarizer in the above range, a polarizing plate with a light transmittance in a preferred range is obtained, whereby a liquid crystal display apparatus with high contrast ratio in a front direction can be obtained.

Preferably, each of the first polarizer and the second polarizer further contains potassium. The potassium content is preferably 0.2% by weight to 1.0% by weight, more preferably 0.3% by weight to 0.9% by weight, and particularly preferably 0.4% by weight to 0.8% by weight. By setting the potassium content in the above range, a polarizing plate with a light transmittance in a preferred range and high degree of polarization can be obtained.

Preferably, each of the first polarizer and the second polarizer further contains boron. The boron content is preferably 0.5% by weight to 3.0% by weight, more preferably 1.0% by weight to 2.8% by weight, and particularly preferably 1.5% by weight to 2.6% by weight. By setting the boron content in the above range, a polarizing plate with a light transmittance in a preferred range and high degree of polarization can be obtained.

The polyvinyl alcohol-based resin may be prepared by saponifying vinyl ester-based polymer obtained by polymerizing a vinyl ester-based monomer. A degree of saponification of the polyvinyl alcohol-based resin is preferably 95.0 mol % to 99.9 mol %. The degree of saponification of the polyvinyl alcohol-based resin may be determined in accordance with JIS K6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K6726-1994.

As a method of obtaining a polymer film mainly containing the polyvinyl alcohol-based resin, any suitable forming method can be adopted. As a specific example of the forming method, there is a method described in JP 2000-315144 A [Example 1].

A polymer film containing the polyvinyl alcohol-based resin as a main component preferably contains a plasticizer and/or a surfactant. Examples of the plasticizer include polyhydric alcohols such as ethylene glycol and glycerin. An example of the surfactant includes a non-ionic surfactant. The contents of the plasticizer and surfactant are preferably more than 1 to 10 parts by weight with respect to 100 parts by weight of a polyvinyl alcohol-based resin. The polyhydric alcohol and the surfactant are used for the purpose of further enhancing the dyeability and stretchability of a polarizer.

As the polymer film mainly containing the polyvinyl alcohol-based resin, a commercially available product can be used as it is. Specific examples of the commercially available polymer film mainly containing a polyvinyl alcohol-based resin include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 3:
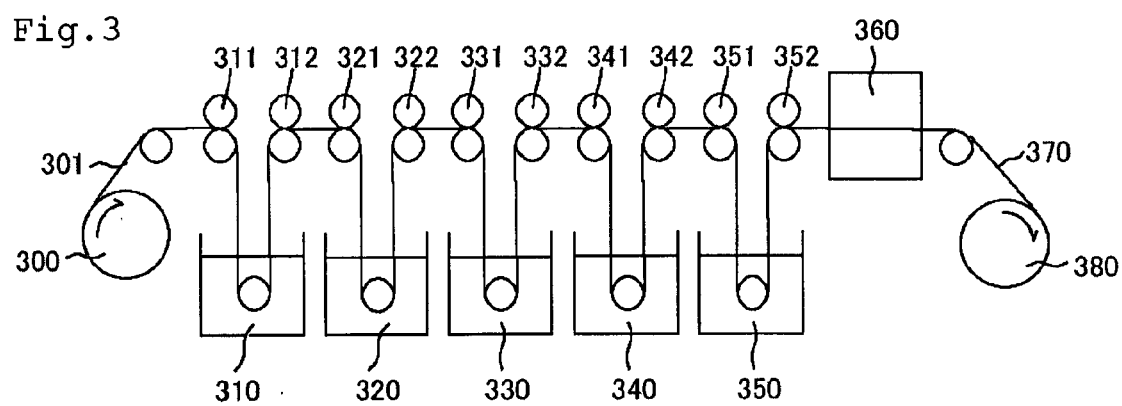
FIG. 3 is a schematic diagram illustrating a concept of a typical production process of a polarizer used in the present invention.

An example of the method of producing a polarizer will be described referring to FIG. 3. FIG. 3 is a schematic view showing a concept of a typical method of producing a polarizer used in the present invention. For example, a polymer film 301 containing a polyvinyl alcohol-based resin as a main component is fed from a feed part 300, immersed in a swelling bath 310 containing pure water and a coloring bath 320 containing an aqueous iodine solution, so as to be subjected to swelling treatment and coloring treatment under tension in a longitudinal direction of the film by rollers 311, 312, 321, and 322 at different speed ratios. Next, the film subjected to swelling treatment and coloring treatment is immersed in a first crosslinking bath 330 and a second crosslinking bath 340 containing potassium iodide, so as to be subjected to crosslinking treatment and final stretching treatment under tension in a longitudinal direction of the film by rollers 331, 332, 341, and 342 at different speed ratios. The film subjected to crosslinking treatment is immersed in a water washing bath 350 containing pure water by rollers 351 and 352, so as to be subjected to water washing treatment. The film subjected to water washing treatment is dried by drying means 360 to adjust its moisture content at, for example, 10% to 30%, and taken up in a take-up part 380. The polymer film containing a polyvinyl alcohol-based resin as a main component may be stretched to a 5 times to 7 times length of the original length through the above-mentioned processes, to thereby obtain a polarizer 370.

In the above coloring process, the adding amount of iodine in a coloring bath is preferably 0.01 parts by weight to 0.15 parts by weight, and more preferably 0.01 parts by weight to 0.05 parts by weight with respect to 100 parts by weight of water. By setting the adding amount of iodine in a coloring bath in the above range, a polarizing plate having excellent optical properties can be obtained. When the adding amount of iodine in a coloring bath is increased in the above range, a polarizing plate with low light transmittance can be obtained. Further, when the adding amount of iodine in a coloring bath is decreased in the above range, a polarizing plate with high light transmittance can be obtained.

The adding amount of potassium iodide in the above coloring bath is preferably 0.05 parts by weight to 0.5 parts by weight, and more preferably 0.1 parts by weight to 0.3 parts by weight with respect to 100 parts by weight of water. By setting the adding amount of potassium iodide in the above range, a polarizing plate with a light transmittance in a preferred range and high degree of polarization can be obtained.

In the above coloring process, the adding amount of potassium iodide in the first cross-linking bath and the second cross-linking bath is preferably 0.5 parts by weight to 10 parts by weight, and more preferably 1 part by weight to 7 parts by weight with respect to 100 parts by weight of water. The adding amount of boric acid in the first cross-linking bath and the second cross-linking bath is preferably 0.5 parts by weight to 10 parts by weight, and more preferably 1 part by weight to 7 parts by weight. By setting the adding amount of potassium iodide and boric acid in the above range, a polarizing plate having excellent optical properties with a light transmittance in a preferred range and high degree of polarization can be obtained.

<C-2. Protective Layer>

The first and second polarizing plate used in the present invention preferably includes at least a polarizer and protective layers placed on both sides of the polarizer. The protective layer can prevent the shrinkage and expansion of the polarizer and the degradation in the polarizer due to UV-light, which can provide a polarizing plate with high durability.

In one embodiment, the first polarizing plate preferably includes at least a first polarizer, a first protective layer placed on a liquid crystal cell side of the first polarizer, and a second protective layer placed on an opposite side with respect to the liquid crystal cell side of the first polarizer. Further, the second polarizing plate preferably includes at least a second polarizer, a third protective layer placed on a liquid crystal cell side of the second polarizer, and a fourth protective layer placed on an opposite side with respect to the liquid crystal cell side of the second polarizer.

The protective layer and the polarizer can be laminated via any suitable adhesion layer. In the specification of the present invention, the term "adhesion layer" refers to a layer that connects surfaces of adjacent optical members and integrate them with a practically sufficient adhesive strength and adhesive time. Examples of a material for forming the adhesion layer include an adhesive and an anchor coat agent. The adhesion layer may have a multi-layered structure in which an anchor coat layer is formed on the surface of an adherend and an adhesive layer is formed thereon. Further, the adhesion layer may be a thin layer (which may be referred to as a hair line) which cannot be recognized with naked eyes.

In the case where the polarizer contains as a main component a polyvinyl alcohol-based resin with iodine, a material for forming the adhesion layer is preferably a water-soluble adhesive. The water-soluble adhesive is preferably a water-soluble adhesive containing a polyvinyl alcohol-based resin as a main component. As the adhesion layer, a commercially available adhesive can also be used as it is. Alternatively, a commercially available adhesive may be mixed with a solvent and an additive. An example of the commercially available adhesive containing a polyvinyl alcohol-based resin as a main component includes "GOHSEFIMER Z-200" (trade name) manufactured by Nippon Synthetic Chemical Industry Co., Ltd.

The water-soluble adhesive can further contain a cross-linking agent as an additive. Examples of the kind of the cross-linking agent include an amine compound, an aldehyde compound, a methylol compound, an epoxy compound, an isocyanate compound, and a polyvalent metal salt. As the cross-linking agent, a commercially available cross-linking agent can also be used as it is. Examples of the commercially available cross-linking agent include an aldehyde compound "Glyoxazale" (trade name) manufactured by Nippon Synthetic Chemical Industry Co., Ltd. The adding amount of the cross-linking agent can be appropriately adjusted in accordance with the purpose, and is generally more than 0 to 10 parts by weight with respect to 100 parts by weight of a solid content of a water-soluble adhesive.

[First Protective Layer]

A first protective layer is placed on a liquid crystal cell side of a first polarizer. As the thickness of the first protective layer, any suitable value can be selected appropriately in accordance with the purpose. The thickness of the first protective layer is preferably 20 µm to 100 µm. The light transmittance (T[590]) at a wavelength of 590 nm of the first protective layer is preferably 90% or more.

The first protective layer is placed between the polarizer and the liquid crystal cell, so the optical properties thereof may influence the display properties of a liquid crystal display apparatus. Thus, it is preferred that the first protective layer has a suitable retardation value. Preferably, the refractive index ellipsoid of the first protective layer exhibits a relationship of nx=ny≧nz. In the specification of the present invention, "exhibiting a relationship of nx=ny≧nz" means exhibiting a relationship of nx=ny>nz (which may also be referred to as negative uniaxiality) or a relationship of nx=ny=nz (which may also be referred to as optical isotropy).

In the case where the refractive index ellipsoid of the first protective layer exhibits a relationship of nx=ny>nz, Re[590] of the first protective layer is less than 10 nm, Rth[590] is preferably 10 nm to 80 nm, and more preferably 20 nm to 70 nm. In the case where the refractive index ellipsoid of the first protective layer exhibits a relationship of nx=ny=nz, both Re[590] and Rth[590] of the first protective layer are less than 10 nm.

As a material for forming the first protective layer, any suitable one can be adopted. Preferably, the protective layer is a polymer film containing a cellulose-based resin, a nor-bornene-based resin, or an acrylic resin. The polymer film containing a cellulose-based resin can be obtained, for example, by a method described in Example 1 of JP 07-112446 A. The polymer film containing a norbornene-based resin can be obtained, for example, by a method described in JP 2001-350017 A. The polymer film containing an acrylic resin can be obtained, for example, by a method described in Example 1 of JP 2004-198952 A.

[Second Protective Layer]

A second protective layer is placed on an opposite side with respect to a liquid crystal cell side of the first polarizer. As the second protective layer, any suitable one can be adopted. The thickness of the second protective layer is preferably 20 µm to 100 µm. The light transmittance (T[590]) at a wavelength of 590 nm of the second protective layer is preferably 90% or more.

As a material for forming the second protective layer, any suitable one can be adopted. Preferably, the protective layer is a polymer film containing a cellulose-based resin, a nor-bornene-based resin, or an acrylic resin.

The surface of the second protective layer may be subjected to any suitable surface treatment as long as the above relationship of a light transmittance can be satisfied. For example, as the protective layer, a commercially available polymer film subjected to a surface treatment can be used as it is. Alternatively, a commercially available polymer film can also be subjected to any surface treatment. Examples of the surface treatment include a diffusion treatment (anti-glare treatment), a reflection preventive treatment (antireflection treatment), a hard coat treatment, and an antistatic treatment. Examples of the commercially available diffusion treatment (anti-glare treatment) products include AG150, AGS1, AGS2, and AGT1 manufactured by Nitto Denko Corporation. Examples of the commercially available reflection preventive treatment (antireflection treatment) products include ARS and ARC manufactured by Nitto Denko Corporation. An example of the commercially available film subjected to a hard coat treatment and an antistatic treatment includes "KC8UX-HA" (trade name) manufactured by Konica Minolta Holdings, Inc.

[Surface Treatment Layer]

If required, a surface treatment layer may be provided on an opposite side with respect to the side of the second protective layer on which the first polarizer is provided. As the surface treatment layer, any suitable one can be adopted in accordance with the purpose. Examples of the surface treatment layer include a diffusion treatment (anti-glare treatment) layer, a reflection preventive treatment (anti-reflection treatment) layer, a hard coat treatment layer, and an antistatic treatment layer. These surface treatment layers are used for the purpose of preventing a screen from being contaminated or damaged, and preventing a display image from becoming difficult to see due to the incidence of light of a fluorescent lamp in a room or sunlight. As the surface treatment layer, a base film with a treatment agent for forming the treatment layer bonded to the surface thereof is generally used. The base film may also function as the second protective layer. Further, the surface treatment layer may have, for example, a multi-layered structure in which a hard coat treatment layer is laminated on an antistatic treatment layer. An example of the commercially available surface treatment layer subjected to a reflection preventive treatment includes ReaLook series manufactured by Nippon Oil and Fats Co., Ltd.

[Third Protective Layer]

A third protective layer is placed on a liquid crystal cell side of the second polarizer. As the third protective layer, any suitable one can be adopted appropriately from the material, properties, conditions, and the like described with respect to the first protective layer. The first protective layer and the third protective layer may be the same as or different from each other.

[Fourth Protective Layer]

A fourth protective layer is placed on an opposite side with respect to a liquid crystal cell side of the second polarizer. As the fourth protective layer, any suitable one can be adopted from the material, properties, conditions, and the like described with respect to the second protective layer. The second protective layer and the fourth protective layer may be the same as or different from each other.

<D. Retardation Plate>

A retardation plate (A) used in the present invention is placed between the liquid crystal cell and the second polarizing plate. In the specification of the present invention, the term "retardation plate" refers to a transparent layer having a retardation in an in-plane and/or thickness direction.

The thickness of the retardation plate (A) is preferably 0.5 µm to 200 µm. The light transmittance (T[590]) at a wavelength of 590 nm of the retardation plate (A) is preferably 90% or more.

The refractive index ellipsoid of the retardation plate (A) exhibits a relationship of $nx \geq ny > nz$. In the specification of the present invention, "exhibiting a relationship of $nx \geq ny > nz$" means exhibiting a relationship of $nx=ny>nz$ or a relationship (which may also be referred to as negative biaxiality) of $nx>ny>nz$.

Preferably, the refractive index ellipsoid of the retardation plate (A) exhibits a relationship of $nx>ny>nz$. The reason for this is as follows. A liquid crystal cell can be compensated at high degree merely by placing one retardation plate (A) between the first polarizer and the third polarizer, so a thin liquid crystal panel can be obtained at low cost. Further, the number of lamination of the retardation plate (A) is small, so the slow axis of such a retardation plate (A) is unlikely to be shifted from a desired position, whereby a liquid crystal display apparatus with higher contrast ratio in a front direction can be obtained. A liquid crystal panel that is compensated using only one retardation plate (A) is also referred to as a "liquid crystal panel of a compensation system with one retardation plate".

In the case where the refractive index ellipsoid of the retardation plate (A) exhibits a relationship of $nx=ny>nz$, Re[590] of the retardation plate (A) is less than 10 nm, and preferably 5 nm or less. In the case where the refractive index ellipsoid of the retardation plate (A) exhibits a relationship of $nx>ny>nz$, Re[590] of the retardation plate (A) is 10 nm or more, preferably 20 nm to 80 nm, more preferably 30 nm to 70 nm, and particularly preferably 30 nm to 60 nm. By setting Re[590] in the above range, a liquid crystal display apparatus exhibiting excellent display properties with high contrast ratio in front and oblique directions can be obtained.

Rth[590] of the retardation plate (A) can beset appropriately depending upon a retardation value in a thickness direction of a liquid crystal cell. The Rth[590] is preferably 100 nm to 400 nm, more preferably 150 nm to 350 nm, and particularly preferably 150 nm to 300 nm. By setting Rth[590] in the above range, a liquid crystal display apparatus exhibiting excellent display properties with high contrast ratio in an oblique direction can be obtained.

In the case where the refractive index ellipsoid of the retardation plate (A) exhibits a relationship of $nx>ny>nz$, Rth[590] is larger than Re[590]. More specifically, a Nz coefficient of the retardation plate (A) is larger than 1. The Nz coefficient is preferably more than 1.1 to 8 or less, more preferably 2 to 7, and particularly preferably 2.5 to 6. By setting the Nz coefficient in the above range, a liquid crystal panel of a compensation system with one retardation layer can be obtained. Further, a liquid crystal display apparatus exhibiting excellent display properties with high contrast ratio in front and oblique directions can be obtained.

As a material for forming the retardation plate (A), any suitable one can be adopted as long as the refractive index ellipsoid exhibits a relationship of $nx \geq ny > nz$. The retardation plate (A) is preferably a retardation film containing a polyimide-based resin, a norbornene-based resin, a cellulose-based resin, a polycarbonate-based resin, a polypropylene-based resin, an acrylic resin, a polyvinyl acetal-based resin, or a polyester-based resin. The retardation plate (A) is particularly preferably a retardation film containing a a polyimide-based resin, or a norbornene-based resin.

[Polyimide-Based Resin]

In the case where the polyimide-based resin is formed into a sheet by solvent casting, molecules are likely to be aligned spontaneously during an evaporation step of a solvent. Therefore, a significantly thin retardation film whose refractive index ellipsoid exhibits a relationship of $nx=ny>nz$ can be produced. The thickness of the retardation film containing the polyimide-based resin is preferably 0.5 µm to 10 µm, and more preferably 1 µm to 5 µm. The birefringence ($\Delta n_{xz}[590]$) in a thickness direction of a retardation film containing the polyimide-based resin is preferably 0.01 to 0.12, and more preferably 0.02 to 0.08. Such a polyimide-based resin can be obtained by a method described in U.S. Pat. No. 5,344,916.

Further, the refractive index ellipsoid of the polyimide-based resin exhibits a relationship of $nx=ny>nz$ as described above. Therefore, the polyimide-based resin does not need a complex stretching method and enables a retardation film whose refractive index ellipsoid exhibits a relationship of $nx>ny>nz$ to be obtained by general longitudinal uniaxial stretching or transverse uniaxial stretching. Thus, even in the case where a retardation film with a large width is produced for a large liquid crystal display apparatus, a slow axis is likely to be uniform in a width direction, and an axis shift is small even when the retardation film is attached to a polarizer.

Consequently, a liquid crystal display apparatus with high contrast ratio in a front direction can be obtained.

Preferably, the polyimide-based resin has a hexafluoroisopropylidene group and/or a trifluoromethyl group. More preferably, the polyimide-based resin includes a repeating unit represented by the following general formula (I) or a repeating unit represented by the following general formula (II). The polyimide-based resin including these repeating units has excellent transparency, solubility with respect to a general-purpose solvent, and large birefringence in thickness direction.

[Chemical Formula 1]

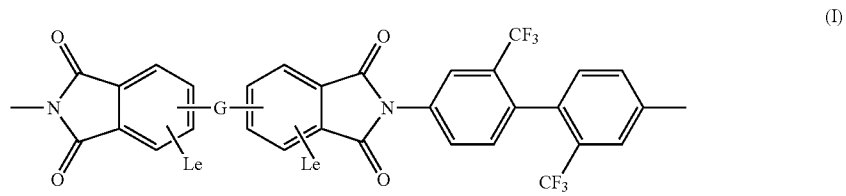

(I)

[Chemical Formula 2]

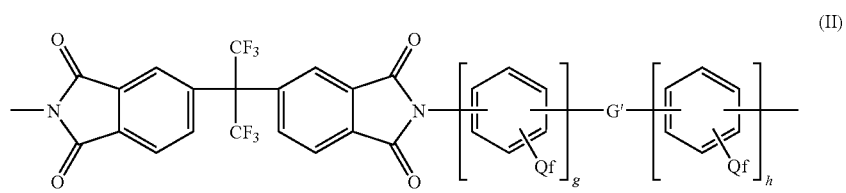

(II)

In the above general formulae (I) and (II), G and G' represent groups independently selected from a covalent bond, a $CH_2$ group, a $C(CH_3)_2$ group, a $C(CF_3)_2$ group, a $C(CX_3)_2$ group (herein, X is halogen), a CO group, an O atom, an S atom, a $SO_2$ group, a $Si(CH_2CH_3)_2$ group, and a $N(CH_3)$ group, and they may be the same or different.

In the above general formula (I), L represents a substituent, and e represents a substitution number thereof. L is, for example, halogen, an alkyl group containing 1 to 3 carbon atoms, a halogenated alkyl group containing 1 to 3 carbon atoms, a phenyl group, or a substituted phenyl group. In the case where L represents plural substituents, they may be the same or different. e represents an integer of 0 to 3.

In the above general formula (II), Q represents a substituent, and f represents a substitution number thereof. Q is, for example, an atom or a group selected from hydrogen, halogen, an alkyl group, a substituted alkyl group, a nitro group, a cyano group, a thioalkyl group, an alkoxy group, an aryl group, a substituted aryl group, an alkylester group, and a substituted alkylester group. In the case where Q represents plural substituents, they may be the same or different. f is an integer from 0 to 4, and each of g and h is an integer of 1 to 3.

The polyimide-based resin can be obtained, for example, by the reaction between tetracarboxylic dianhydride and diamine. The repeating unit in the general formula (I) can be obtained, for example, by using 2,2'-bis(trifluoromethyl)-4,4'-diaminobiphenyl as diamine, and reacting it with tetracarboxylic dianhydride having at least two aromatic rings. The repeating unit in the general formula (II) can be obtained, for example, by using 2,2-bis(3,4-dicarboxyphenyl)hexafluoropropanoic dianhydride as tetracarboxylic dianhydride, and reacting it with diamine having at least two aromatic rings. The reaction may be, for example, chemical imidization that proceeds in two stages or thermal imidization that proceeds in one stage.

As the tetracarboxylic dianhydride, any suitable one can be employed. Examples of the tetracarboxylic dianhydride include: 2,2'-bis(3,4-dicarboxyphenyl)-hexafluoropropanoic dianhydride; 3,3',4,4'-benzophenonetetracarboxylic dianhydride; 2,3,3',4-benzophenonetetracarboxylic dianhydride; 2,2',3,3'-benzophenonetetracarboxylic dianhydride; 2,2'-dibromo-4,4',5,5'-biphenyltetracarboxylic dianhydride; 2,2'-bis(trifluoromethyl)-4,4',5,5'-biphenyltetracarboxylic dianhydride; 3,3',4,4'-biphenyltetracarboxylic dianhydride; 4,4'-bis(3,4-dicarboxyphenyl)ether dianhydride; 4,4'-oxydiphthalic dianhydride; 4,4'-bis(3,4-dicarboxyphenyl) sulfonic dianhydride; bis(2,3-dicarboxyphenyl)methane dianhydride; and bis(3,4-dicarboxyphenyl)diethylsilane dianhydride.

As the diamine, any suitable one can be employed. Examples of the diamine include: 2,2'-bis(trifluoromethyl)-4,4'-diaminobiphenyl; 4,4'-diaminobiphenyl; 4,4'-diaminophenyl methane; 4,4'-(9-fluorenylidene)-dianiline; 3,3'-dichloro-4,4'-diaminodiphenyl methane; 2,2'-dichloro-4,4'-diaminobiphenyl; 4,4'-diaminodiphenyl ether; 3,4'-diaminodiphenyl ether; 4,4'-diaminodiphenyl sulfone; and 4,4'-diaminodiphenyl thioether.

As the weight average molecular weight (Mw) of the polyimide-based resin, the weight average molecular weight (Mw) using polyethylene oxide standard including as a developing solvent a dimethylformamide solution (1 L of a dimethylformamide solution prepared by: adding 10 mM lithium bromide and 10 mM phosphoric acid; and making up to 1 L) is preferably 20,000 to 180,000. Further, the imidation rate of the polyimide-based resin is preferably 95% or more. The imidation rate can be determined with a nuclear magnetic resonance (NMR) spectrum by using an integrated intensity ratio of a peak of proton derived from polyamic acid, which is a precursor of polyimide, and a peak of proton derived from polyimide.

The retardation film containing the polyimide-based resin can be obtained by any suitable forming method. Preferably, the retardation film containing the polyimide-based resin is produced by stretching a polymer film which has been formed into a sheet by solvent casting, by using a longitudinal uniaxial stretching method or a transverse uniaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

[Norbornene-Based Resin]

The norbornene-based resin has a small absolute value ($C[590]$) of a photoelastic coefficient, so a liquid crystal display apparatus with small optical unevenness can be obtained. $C[590]$ of the norbornene-based resin is preferably $1\times10^{-12}$ to $20\times10^{-12}$, and more preferably $1\times10^{-12}$ to $10\times10^{-12}$. In the specification of the present invention, the term-"norbornene-based resin" refers to a (co)polymer obtained by using a norbornene-based monomer having a norbornene ring for a partial or entire starting material (monomer). The "(co)polymer" represents a homopolymer or a copolymer.

In the norbornene-based resin, a norbornene-based monomer having a norbornene ring (having a double-bond in a norbornene ring) is used as a starting material. The norbornene-based resin may or may not have a norbornene ring in a constituent unit in the state of a (co)polymer. In the state of the (co)polymer, examples of the norbornene-based resin having a norbornene ring in a constituent unit include tetracyclo[$4.4.1^{2,5}.1^{7,10}$.0]deca-3-ene, 8-methyltetracyclo[$4.4.1^{2,5}.1^{7,10}$.0]deca-3-ene, and 8-methoxycarbonyltetracyclo[$4.4.1^{2,5}.1^{7,10}$.0]deca-3-ene. The norbornene-based resin having no norbornene ring in a constituent unit in the state of a (co)polymer is a (co)polymer obtained, for example, by using a monomer to be a 5-membered ring by cleavage. Examples of the monomer to be a 5-membered ring by cleavage include norbornene, dicyclopentadiene, 5-phenylnorbornene, and a derivative thereof. In the case where the norbornene-based resin is a copolymer, the arrangement state of molecules is not particularly limited, and may be a random copolymer, a block copolymer, or a graft copolymer.

Examples of the above norbornene-based resin include (A) a resin obtained through hydrogenation of a ring-opened (co)polymer of a norbornene-based monomer, and (B) a resin obtained through addition (co)polymerization of a norbornene-based monomer. The ring-opened copolymer of a norbornene-based monomer includes a resin obtained through hydrogenation of a ring-opened copolymer of at least one norbornene-based monomer and α-olefins, cycloalkenes, and/or non-conjugate dienes. The above resin obtained through addition (co)polymerization of a norbornene-based monomer includes a resin obtained through addition (co)polymerization of at least one norbornene-based monomer and α-olefins, cycloalkenes, and/or non-conjugate dienes.

The above resin obtained through hydrogenation of a ring-opened (co)polymer of a norbornene-based monomer can be obtained by subjecting a norbornene-based monomer or the like to a metathesis reaction to obtain a ring-opened (co)polymer, and further by hydrogenating the ring-opened (co)polymer. Specific examples include a method described in paragraphs [0059] to [0060] in JP 11-116780 A, and a method described in paragraphs [0035] to [0037] of JP 2001-350017 A. The above resin obtained through addition (co)polymerization of the norbornene-based monomer can be obtained by, for example, the method described in Example 1 of JP 61-292601 A.

As the weight average molecular weight (Mw) of the norbornene-based resin, a value measured by a gel permeation chromatography method (polystyrene standard) with a tetrahydrofuran solvent is preferably 20,000 to 500,000. The glass transition temperature (Tg) of the norbornene-based resin is preferably 120° C. to 170° C. With the above resin, a film having excellent heat stability and excellent stretchability can be obtained. The glass transition temperature (Tg) is a value calculated by a DSC method in accordance with JIS K 7121.

The retardation film containing the norbornene-based resin can be obtained by any suitable forming method. Preferably, the retardation film containing the norbornene-based resin is produced by stretching a polymer film which has been formed into a sheet by solvent casting or melt extrusion, by using a transverse uniaxial stretching method, a longitudinal and transverse simultaneous biaxial stretching method, or a longitudinal and transverse sequential biaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

(Cellulose-Based Resin)

As the cellulose-based resin, any appropriate cellulose-based resin can be adopted. Preferably, a cellulose organic acid ester or a cellulose mixed organic acid ester is used, which is obtained by substituting an acetyl group, a propionyl group, and/or a butyl group for a part or an entirety of a hydroxy group of cellulose. Specific examples of the cellulose organic acid ester include cellulose acetate, cellulose propionate, and cellulose butylate. Specific examples of the cellulose mixed organic acid ester include cellulose acetate propionate and cellulose acetate butylate. Such a cellulose-based resin can be obtained by the method described, for example, in [0040] and [0041] of JP 2001-188128 A.

Regarding the weight average molecular weight (Mw) of the cellulose-based resin, a value measured by a gel permeation chromatograph (GPC) method with a tetrahydrofuran solvent is preferably 20,000 to 1,000,000, and more preferably 25,000 to 800,000. If the weight average molecular weight is in the above range, the retardation film having excellent mechanical strength, and having satisfactory solubility, formability, and operability of flow-casting can be obtained.

A glass transition temperature (Tg) of the cellulose-based resin is preferably 110 to 185° C. Tg of 110° C. or higher facilitates formation of a film with favorable thermal stability, and Tg of 185° C. or less has excellent forming processability.

The retardation film containing the cellulose-based resin can be obtained by any suitable forming method. Preferably, the retardation film containing the cellulose-based resin is manufactured by stretching a film, which had been formed into a sheet, by solvent casting by transverse uniaxial stretching, longitudinal and transverse simultaneous biaxial stretching, or longitudinal and transverse sequential biaxial stretching. The temperature (stretching temperature) at which the film is stretched is preferably 120° C. to 200° C. Further, the magnification (stretching ratio) at which the film is stretched is preferably more than 1 to 3 times or less.

As the retardation film containing a cellulose-based resin, a commercially available film can be used as it is. Examples of the commercially available polymer film containing a cellulose-based resin include FUJITAC series (ZRF80S, TD80UF, TDY-80UL (trade name)) manufactured by Fujifilm Corporation, and "KC8UX2M" (trade name) manufactured by Konica Minolta Opto, Inc.

(Polycarbonate-Based Resin)

As the above polycarbonate-based resin, an aromatic polycarbonate is preferably used. The aromatic polycarbonate can be typically obtained by the reaction between a carbonate precursor and an aromatic dihydric phenol compound. Specific examples of the carbonate precursor include phosgene, bischloroformate of dihydric phenols, diphenyl carbonate, di-p-tolylcarbonate, phenyl-p-tolylcarbonate, di-p-chlorophenylcarbonate, and dinaphthylcarbonate. Of those, phosgene and diphenylcarbonate are preferred. Specific examples of the aromatic dihydric phenol compound include: 2,2-bis (4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. They may be used alone or in combination. Preferred are: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. In particular, 2,2-bis(4-hydroxyphenyl)propane and 1,1-bis(4-hydroxyphenyl)-3,3,5-trimethylcyclohexane are preferably used in combination.

(Polypropylene-Based Resin)

The polypropylene-based resin can be obtained by, for example, subjecting propylene to polymerization, or subjecting propylene and a copolymerizable monomer to copolymerization, in the presence of a catalyst known in the art.

(Acrylic Resin)

The acrylic resin can be obtained by, for example, subjecting acrylate-based monomers to addition polymerization. Examples of the acrylic resin include polymethyl methacrylate (PMMA), polybutyl methacrylate, and polycyclohexyl methacrylate.

(Polyvinyl Acetal-Based Resin)

The polyvinyl acetal-based resin can be obtained by conducting a condensation reaction (also referred to acetalization) between a polyvinyl alcohol-based resin, and two or more aldehydes, two or more ketones or at least one aldehyde and at least one ketone.

The acetalization includes a reaction between a polyvinyl alcohol-based resin, and an aldehyde or a ketone in the presence of a strong inorganic acid catalyst or a strong organic acid catalyst. Specific examples of an acid catalyst include hydrochloric acid, sulfuric acid, phosphoric acid, and p-toluenesulfonic acid. A reaction temperature in acetalization is typically higher than 0° C. and a boiling point of a solvent to be used or lower, preferably 10° C. to 100° C., and more preferably 20° C. to 80° C. A reaction temperature within the above ranges can provide a polyvinyl acetal-based resin at high yield. Specific examples of the solvent to be used in acetalization include: alcohols such as methanol, ethanol, propanol, and butanol; cyclic ethers such as 4-dioxane; and aprotic solvents such as N,N-dimethylformamide, N-methylpyrrolidone, and dimethylsulfoxide. The solvent may be used alone or in combination. Further, water and the above-mentioned solvent may be mixed for use.

The polyvinyl alcohol-based resin to be used as a raw material of the polyvinyl acetal-based resin may be obtained by, for example: saponifying a vinyl ester-based polymer obtained through polymerization of a vinyl ester-based monomer; and converting vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate. Of those, vinyl acetate is preferred.

An appropriate average degree of polymerization may be employed as an average degree of polymerization of the polyvinyl alcohol-based resin. The average degree of polymerization of the polyvinyl alcohol-based resin is preferably 800 to 3,600, more preferably 1,000 to 3,200, and most preferably 1,500 to 3,000. The average degree of polymerization of the polyvinyl alcohol-based resin can be determined through a method in accordance with JIS K6726 (:1994).

Examples of the aldehyde include benzaldehydes and 1-Naphthaldehyde. Specific examples of benzaldehydes include: 2-methylbenzaldehyde; 2-chlorobenzaldehyde; 2-nitrobenzaldehyde; 2-ethoxybenzaldehyde; 2-(trifluoromethyl)benzaldehyde; 2,4-dichlorobenzaldehyde; 2,4-dihydroxybenzaldehyde; sodium 2,4-disulfobenzaldehyde; disodium o-sulfobenzaldehyde; p-dimethylaminobenzaldehyde; 2,6-dimethylbenzaldhyde; 2,6-dichlorobenzaldehyde; 2,6-dimethoxybenzaldehyde; 2,4,6-trimethylbenzaldehyde (mesitaldehyde); 2,4,6-triethylbenzaldehyde; and 2,4,6-trichlorobenzaldehyde. Specific examples of 1-naphthaldehydes include: 2-methoxy-1-naphthaldehyde, 2-ethoxy-1-naphthaldehyde, 2-propoxy-1-naphthaldehyde, 2-methyl-1-naphthaldehyde and 2-hydroxy-1-naphthaldehyde. The aldehyde may be subjected to appropriate modification for use.

Examples of the ketone include acetophenones, benzophenones, and 1-naphthones. Specific examples of acetophenones include: 2-methylacetophenone; 2-aminoacetophenone; 2-chloroacetophenone; 2-nitroacetophenone; 2-hydroxyacetophenone; 2,4-dimethylacetophenone; 4'-phenoxy-2,2-dichloroacetophenone; and 2-bromo-4'-chloroacetophenone. Examples of benzophenones include: 2-methylbenzophenone; 2-aminobenzophenone; 2-hydroxybenzophenone; 4-nitrobenzophenone; 2,4'-dichlorobenzophenone; 2,4'-dihydroxybenzophenone; 4,4'-dichlorobenzophenone; 4,4'-dihydroxybenzophenone; 2-hydroxy-4-methoxybenzophenone; and 2-chloro-4'-dichlorobenzophenone. Specific examples of 1-naphthones include: 2-hydroxy-1-acetonaphthone and 8'-hydroxy-1'-benzonaphthone. Further examples of aldehyde and ketone include: 2-naphthaldehyde having a substituent; 9-anthraldehyde; 9-anthraldehyde having a substituent; acetonaphthone; fluorene-9-aldehyde; and 2,4,7-trinitrofluoren-9-one. The ketone may be subjected to appropriate modification for use.

A degree of acetalization of the polyvinyl acetal-based resin is preferably 40 mol % to 99 mol %, more preferably 50 mol % to 95 mol %, and most preferably 60 mol % to 90 mol %. A degree of acetalization within the above ranges can provide a polymer film having excellent transparency by an extrusion method. As a result, the polymer film is stretched to thereby provide a first optical compensation layer satisfying the above-described optical properties. The degree of acetalization refers to a ratio of vinyl alcohol units actually acetalized to vinyl alcohol units which may be converted into acetal units through acetalization. The degree of acetalization of the polyvinyl alcohol-based resin can be determined from a nuclear magnetic resonance spectrum ($^1$H-NMR).

The glass transition temperature (Tg) of the polyvinyl acetal-based resin is preferably 90° C. to 185° C., more preferably 90° C. to 150° C., and most preferably 100° C. to 140° C.

(Polyester-Based Resin)

Examples of the polyester-based resin include polyethylene terephthalate (PET), and polybutylene terephthalate (PBT).

The retardation film can further contain any suitable additive. Examples of the additive include a plasticizer, a heat stabilizer, a light stabilizer, a lubricant, an antioxidant, a UV absorber, a flame retardant, a colorant, an antistatic agent, a compatibilizing agent, a cross-linking agent, and a tackifier. The content of the additive is preferably more than 0 and 10 parts by weight or less with respect to 100 parts by weight of the resin forming the retardation film.

The retardation plate (A) may use a liquid crystal composition. In the case where a liquid crystal composition is used, the retardation plate (A) includes a solidified layer or a cured layer of a liquid crystal composition containing a bar-shaped liquid crystal compound arranged in a planar alignment, or a solidified layer or a cured layer of a liquid crystal composition containing a discotic liquid crystal compound arranged in a columnar alignment. If the liquid crystal compound is used, the birefringence in a thickness direction is large, so a thin retardation film can be obtained.

Figure 4A:
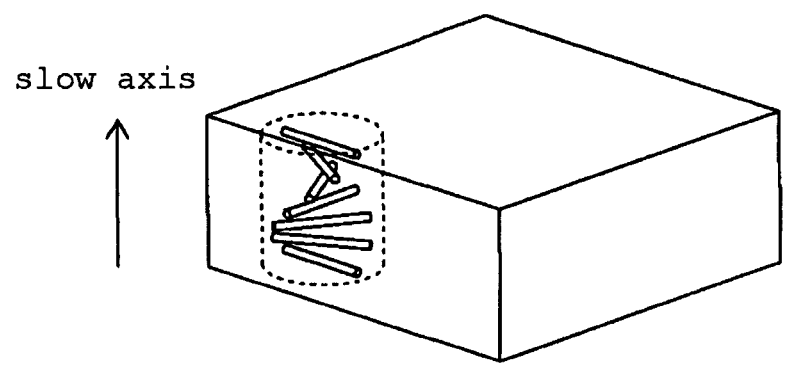
FIG. 4A is a schematic diagram explaining a bar-shaped liquid crystal compound in a planar alignment.
Figure 4B:
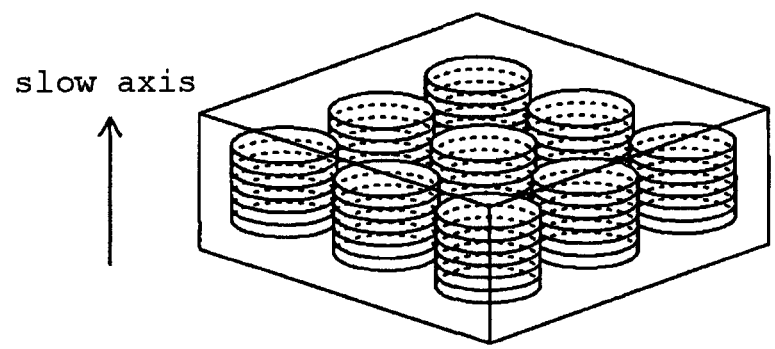
FIG. 4B is a schematic diagram explaining a discotic liquid crystal compound in a columnar alignment.

In the specification of the present invention, the term "planar alignment" refers to a state where a bar-shaped liquid crystal compound (calamitic liquid crystal compound) is aligned such that a helical axis of liquid crystal is vertical to both substrate surfaces (see FIG. 4A, for example). The term "columnar alignment" refers to a state where a discotic liquid crystal compound is aligned so as to stack as a column (see FIG. 4B, for example). Further, the term "solidified layer" refers to a layer which is prepared by cooling a softened or molten liquid crystal composition or a liquid crystal composition in a solution state into a solidified state. The term "cured layer" refers to a layer which is prepared by partly or entirely crosslinking the liquid crystal composition by heat, a catalyst, light, and/or radiation into a stable insoluble and non-melted state or a stable hardly soluble and hardly melted state. Note that the cured layer includes a cured layer prepared from a solidified layer of a liquid crystal composition.

The solidified layer or the cured layer of a liquid crystal composition containing a bar-shaped liquid crystal compound arranged in a planar alignment can be obtained by a method described in JP 2003-287623 A, for example. Further, the retardation film composed of a solidified layer or a cured layer of a liquid crystal composition containing a discotic liquid crystal compound arranged in a columnar alignment can be obtained, for example, by a method described in JP 09-117983 A.

The liquid crystal panel of the present invention can further include another retardation plate (B) between the liquid crystal cell and the first polarizing plate. As the another polarization plate (B), an appropriate retardation plate can be adopted depending upon the properties, the material, production conditions, and the like described with respect to the above retardation plate (A). The retardation plate (A) and the another retardation plate (B) may or may not be the same.

<E. Adhesion Layer>

In a preferred embodiment, the polarizing plates (first polarizing plate, second polarizing plate and third polarizing plate) are each attached to a member configuring a liquid crystal panel via an adhesion layer. As a material for forming the adhesion layer, any suitable adhesive and/or anchor coat agent can be selected in accordance with the kind and application of an adherend. Specific examples of the adhesive include a solvent-type adhesive, an emulsion-type adhesive, a pressure-sensitive adhesive, a remoistening adhesive, a condensation polymerization adhesive, a non-solvent-type adhesive, a film-shaped adhesive, and a hot-melt type adhesive, according to the classification based on the form. Specific examples of the adhesive include a synthetic resin adhesive, a rubber-based adhesive, and a natural adhesive, according to the classification based on a chemical structure. The adhesive includes a viscoelastic material (which may also be referred to as a pressure-sensitive adhesive) exhibiting the adhesive strength that can be detectable by the contact under pressure at room temperature.

Preferably, a material for forming the adhesion layer is a pressure-sensitive adhesive (which may also be referred to as an acrylic pressure-sensitive adhesive) in which an acrylic polymer is a base polymer. This is because such a material has excellent transparency, adhesiveness, weather resistance, and heat resistance. The thickness of the acrylic pressure-sensitive layer is generally 5 µm to 50 µm though it can be adjusted appropriately in accordance with the material and application of an adherend.

<F. Liquid Crystal Display Apparatus>

Figure 5:
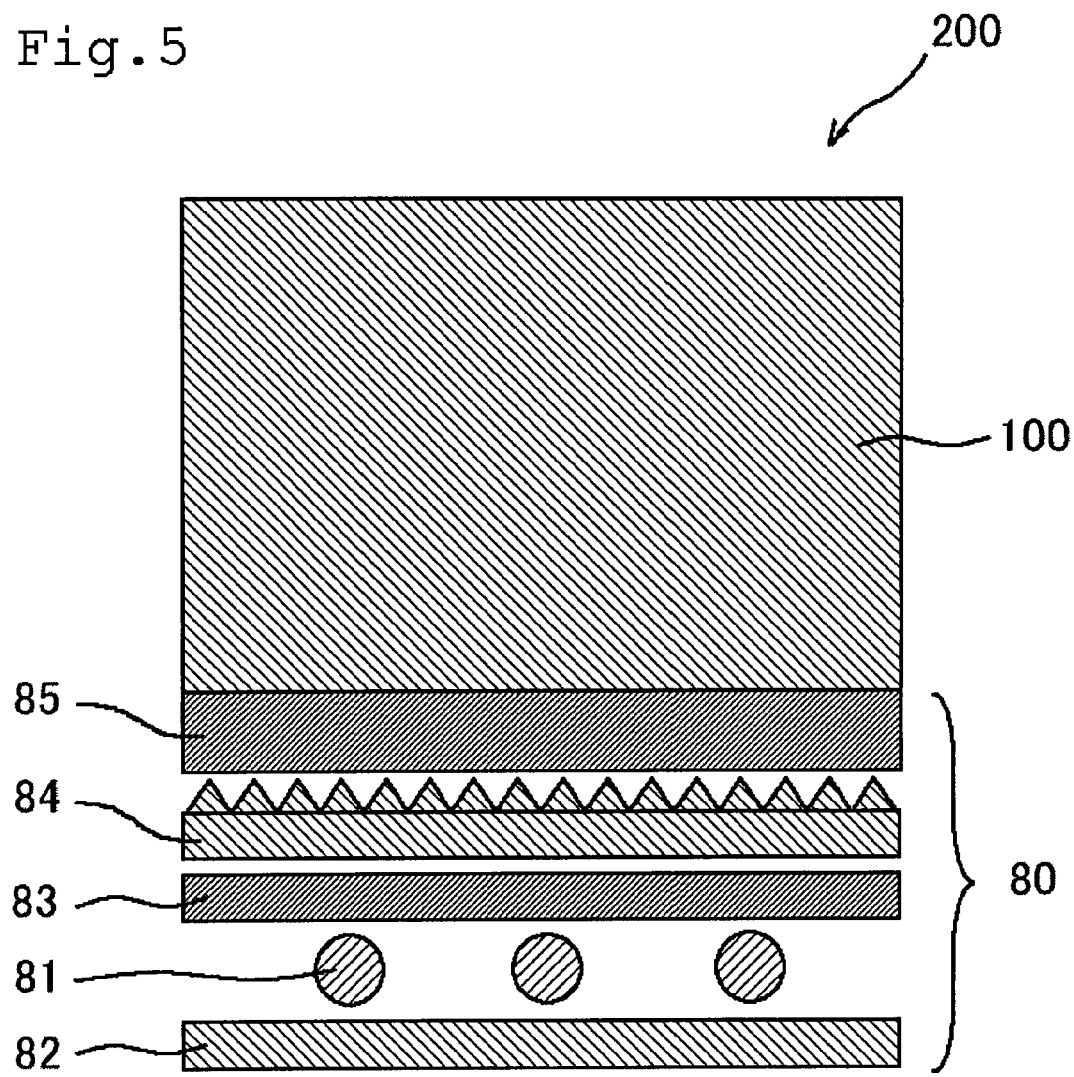
FIG. 5 is a schematic cross-sectional view of a liquid crystal display apparatus according to a preferred embodiment of the present invention.

The liquid crystal display apparatus of the present invention includes the above liquid crystal panel. FIG. 5 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 5 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes a light guide plate and a light reflector. As long as the effects of the present invention are obtained, a part of the optical member illustrated in FIG. 5 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

EXAMPLES

The present invention will be described in more detail by using the following examples and comparative examples. However, the present invention is not limited to the examples. Analytical methods used in the examples are described below.

(1) Light Transmittance of Polarizing Plate:

A light transmittance (T) is a Y-value obtained through a visibility correction by a two-degree field of view (C light source) in accordance with JIS Z 8701-1982.

(2) Method of Measuring Content of Each Element (I, K)

The content of each element was obtained from an X-ray intensity obtained by measuring a circular sample with a diameter of 10 mm by fluorescent X-ray analysis under the following conditions, with a calibration curve previously created using a standard sample.

Analyzer: fluorescent X-ray analyzer (XRF) "ZSX100e" (trade name), manufactured by Rigaku Corporation
Anti-cathode: rhodium
Analyzing crystal: lithium fluoride
Excitation light energy: 40 kV–90 mA
Iodine measurement line: I-LA Potassium measurement line: K-KA
Quantifying method: FP method
2θ angle peak: 103.078 deg (iodine), 136.847 deg (potassium)
Measurement time: 40 seconds (3) Method of Determining Retardation Values (Re[λ] and Rth[λ]), Nz Coefficient, and T[590]

The retardation values were determined by using "KOBRA21-ADH" (trade name, manufactured by Oji Scientific Instruments) at 23° C. The average refractive index was determined by measuring refractive indices by using an Abbe refractometer "DR-M4" (trade name, manufactured by Atago Co., Ltd.).

(4) Method of Measuring Thickness

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C type" (trade name, manufactured by Anritsu Corporation).

(5) Method of Determining Molecular Weight of Polyimide-Based Resin

The molecular weight was calculated through gel permeation chromatography (GPC) by using polystyrene oxide as a standard sample. Apparatus, instruments, and measurement conditions are as follows.

Sample: 0.1% by weight of solution was prepared by dissolving a sample in an eluant.
Pretreatment: after the solution was left at rest for 8 hours, the solution was filtered with a membrane filter of 0.45 μm.
Analyzer: "HLC-8020GPC" manufactured by Tosoh Corporation
Column: $GMH_{XL}$+$GMH_{XL}$+$G2500H_{XL}$ manufactured by Tosoh Corporation
Column size: 7.8 mmφ×30 cm each (90 cm in total)
Eluant: dimethylformamide (1 L of dimethylformamide solution obtained by adding 10 mM of lithium bromide and 10 mM of phosphoric acid, followed by mixing)
Flow rate: 0.8 ml/min.
Detector: RI (differential refractometer)
Column temperature: 40° C.
Injection amount: 100 μl (6) Method of Measuring Contrast Ratio in Front Direction of Liquid Crystal Display Apparatus A backlight was lit in a dark room at 23° C. for 30 minutes, and thereafter, a lens was placed at a position of 50 cm from a panel, using "BM-5" (trade name, manufactured by Topcon Corporation) Then, a white image and a black image were displayed. A Y-value in an XYZ display system at this time was measured. A contrast ratio "YW/YB" in a front direction was calculated from a Y-value (YW: brightness in a white display) in the white image and a Y-value (YB: brightness in a black display) in the black image.

Production of a First Polarizing Plate and Second Polarizing Plate

Reference Example 1

A polymer film ("VF-PS#7500" (trade name) manufacture by Kuraray Co., Ltd.) with a thickness of 75 μm containing a polyvinyl alcohol-based resin as a main component was soaked in 5 baths under the following conditions [1] to [5] while the tension was being applied to the film in a film longitudinal direction, and stretched so that the final stretching ratio became 6.2 times with respect to the film original length. The stretched film was dried in an air-circulating drying oven at 40° C. for one minute, whereby a polarizer A was produced. A polymer film ("TD80UF" (trade name); Re[590]=0 nm, Rth[590]=60 nm, manufactured by Fujifilm Corporation) with a thickness of 80 μm containing a cellulose-based resin was attached to both sides of the polarizer A via a water-soluble adhesive (GOHSEFIMER Z-200 (trade name) manufactured by Nippon Synthetic Chemical Industry Co., Ltd) containing a polyvinyl alcohol-based resin as a main component, whereby a polarizing plate A was produced. The properties of the polarizing plate A are shown in the following Table 1.

<Conditions>
[1] Swelling bath: pure water at 30° C.
[2] Coloring bath: aqueous solution at 30° C. containing 0.033 parts by weight of iodine with respect to 100 parts by weight of water and 0.2 parts by weight of potassium iodide with respect to 100 parts by weight of water
[3] First cross-linking bath: aqueous solution at 40° C. containing 3% by weight of potassium iodide and 3% by weight of boric acid
[4] Second cross-linking bath: aqueous solution at 60° C. containing 5% by weight of potassium iodide and 4% by weight of boric acid
[5] Washing bath: aqueous solution at 25° C. containing 3% by weight of potassium iodide

Reference Example 2

A polarizer B and a polarizing plate B were produced by the same conditions and method as those in Reference Example 1, except that the adding amount of iodine in Condition [2] was 0.032 parts by weight with respect to 100 parts by weight of water. The properties of the polarizing plate B are shown in the following Table 1.

Reference Example 3

A polarizer C and a polarizing plate C were produced by the same conditions and method as those in Reference Example 1, except that the adding amount of iodine in Condition [2] was 0.031 parts by weight with respect to 100 parts by weight of water. The properties of the polarizing plate C are shown in the following Table 1.

Reference Example 4

A polarizer D and a polarizing plate D were produced by the same conditions and method as those in Reference Example 1, except that the adding amount of iodine in Condition [2] was 0.030 parts by weight with respect to 100 parts by weight of water. The properties of the polarizing plate D are shown in the following Table 1.

TABLE 1

|  | Polarizing plate A | Polarizing plate B | Polarizing plate C | Polarizing plate D |
| --- | --- | --- | --- | --- |
| Thickness (μm) | 30 | 30 | 30 | 30 |
| Polarization degree (%) | 99.99 | 99.99 | 99.99 | 99.99 |
| Transmittance (%) | 40.9 | 41.4 | 42.4 | 42.7 |
| Iodine content (weight %) | 3.28732 | 3.07472 | 2.64952 | 2.52196 |
| Potassium content (weight %) | 0.63498 | 0.62508 | 0.60528 | 0.59934 |
| Boric acid content (weight %) | 2 | 2 | 2 | 2 |

Production of Retardation Plate (A1)

Reference Example 5

To a reaction container (500 mL) equipped with a mechanical stirring device, a Dean and Stark device, a nitrogen guide tube, a thermometer, and a cooling tube, 17.77 g (40 mmol) of 2,2'-bis(3,4-dicarboxylphenyl)hexafluoropropanoic dianhydride (manufactured by Clariant (Japan) K.K.) and 12.81 g (40 mmol) of 2,2-bis(trifluoromethyl)-4,4'-diaminobiphenyl (manufactured by Seika Corporation) were added. Then, a solution in which 2.58 g (20 mmol) of isoquinoline was dissolved in 275.21 g of m-cresol was added to the mixture, followed by stirring (600 rpm) at 23° C. for 1 hour, whereby a uniform solution was obtained. Next, the reaction container was raised in temperature so that the temperature in the reaction container became 180±3° C., using an oil bath, followed by stirring for 5 hours while the temperature was kept, whereby a yellow solution was obtained. After the mixture was further stirred for 3 hours, heating and stirring were stopped, and the mixture was allowed to cool to room temperature, whereby the polymer was precipitated as a gel.

Acetone was added to the yellow solution in the reaction container to dissolve the gel completely, whereby a diluted solution (7% by weight) was produced. When the diluted solution was added little by little to 2 L of isopropyl alcohol while stirring, white powder was precipitated. The powder was filtered out, and washed by being input in 1.5 L of isopropyl alcohol. The powder was further washed again by repeating the same operation, and thereafter, the powder was filtered out again. The resultant powder was dried in an air-circulating thermostatic oven at 60° C. for 48 hours, and then, dried at 150° C. for 7 hours, whereby powder of polyimide of the following structural formula (III) was obtained with a yield of 85%. The weight average molecular weight (Mw) of the polyimide was 124,000, and the imidization ratio was 99.9%.

[Chemical Formula 3]

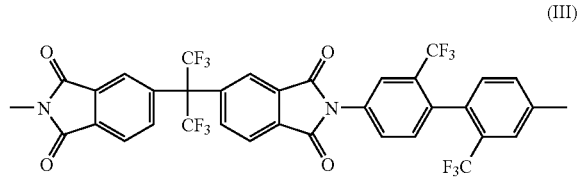

(III)

The polyimide powder was dissolved in methylisobutylketone to prepare 15% by weight of polyimide solution. The polyimide solution was flow-casted uniformly into a sheet on the surface of a triacetylcelullose film (thickness: 80 μm) using a slot die coater. Next, the film was placed in a multi-chamber air-circulating drying oven, and a solvent was evaporated while the temperature was raised gradually from a low temperature of 80° C. for 2 minutes, 135° C. for 5 minutes, to 150° C. for 10 minutes. Next, the film was stretched by 1.14 times at 147° C. by a fixed-end transverse uniaxial stretching method, using a tenter stretching machine. The triacetylcellulose film was peeled to obtain a polyimide layer (retardation plate (A1)) with a thickness of 3.4 μm. In the retardation plate (A1), the refractive index ellipsoid exhibits a relationship of nx>ny>nz, and T[590]=91%, Re[590]=50 nm, Rth[590]=210 nm, and Nz coefficient=4.2.

Preparation of a Liquid Crystal Cell

Reference Example 6

A liquid crystal panel was taken out from a commercially available liquid crystal display apparatus 40-inch liquid crystal television "BRAVIA KDL-40X1000" (trade name, manufactured by Sony Corporation) including a liquid crystal cell of a VA mode, and all the optical films such as polarizing plates placed on upper and lower sides of the liquid crystal cell were removed. The front and reverse surfaces of the liquid crystal cell were washed to obtain a liquid crystal cell.

Preparation of Adhesive Composition

Reference Example 7

To 100 parts by weight of a polyvinyl alcohol-based resin containing an acetoacetyl group (average polymerization degree: 1,200, saponification degree: 98.5 mol %, acetoacetylation degree: 5 mol %), 50 parts by weight of methylol melamine were added, and both were dissolved in pure water at a temperature condition of 30° C. to obtain an aqueous solution containing a solid content of 3.7%. To 100 parts by weight of the aqueous solution, 18 parts by weight of an alumina colloid aqueous solution (average particle diameter: 15 nm, solid content: 10%, positively charged) were added to prepare a polyvinyl alcohol-based adhesive composition containing a metal compound colloid. The viscosity of the obtained adhesive composition was 9.6 mPa·s. The pH of the adhesive composition was 4 to 4.5.

Production of Liquid Crystal Panel and Liquid Crystal Display Apparatus

Example 1

The polarizing plate C produced in Reference Example 3 was attached, as a first polarizing plate, to the viewer side of the liquid crystal cell produced in Reference Example 6 via an acrylic pressure-sensitive adhesive (thickness: 20 μm) so that an absorption axis direction of the polarizer of the polarizing plate C was substantially parallel to the longitudinal direction of the liquid crystal cell.

Then, the retardation plate (A1) produced in Reference Example 5 was attached, as a retardation plate, to an opposite side of the liquid crystal cell with respect to the viewer side (backlight side) via an acrylic pressure-sensitive adhesive (thickness: 20 μm) so that the slow axis direction of the retardation plate (A1) was substantially parallel to the longitudinal direction of the liquid crystal cell.

Then, the polarizing plate D produced in Reference Example 4 was attached, as a second polarizing plate, to the surface of the backlight side of the retardation plate (A1) via an acrylic pressure-sensitive adhesive (thickness: 20 μm) so that the absorption axis direction of the polarizer of the polarizing plate D was substantially perpendicular to the longitudinal direction of the liquid crystal cell. At this time, the absorption axis direction of the polarizer of the first polarizing plate and the absorption axis direction of the polarizer of the second polarizing plate are substantially perpendicular to each other. Further, the slow axis direction of the retardation plate (A1) is substantially perpendicular to the absorption axis direction of the polarizer of the second polarizing plate.

Further, a third polarizing plate (linearly polarized light separation type reflective polarizing plate, "DBEF" (trade name), manufactured by 3M Company) was attached to the laminate thus obtained via an acrylic pressure-sensitive adhesive (thickness: 20 μm) so that the transmission axis direction of the third polarizing plate was substantially parallel to the transmission axis of the above second polarizing plate.

The liquid crystal panel thus obtained was combined with a backlight unit of the original liquid crystal apparatus to produce a liquid crystal display apparatus. Table 2 shows the properties of the liquid crystal display apparatus thus obtained.

Examples 2 to 6

Liquid crystal panels and liquid crystal display apparatuses were produced in the same way as in Example 1, except for using polarizing plates shown in Table 2 as the first and second polarizing plates. Table 2 shows the properties of the obtained liquid crystal display apparatuses.

Examples 7 to 8

Liquid crystal panels and liquid crystal display apparatuses were produced in the same way as in Example 1, except for using the polarizing plates shown in Table 2 as the first and second polarizing plates and using a linearly polarized light separation type reflective polarizing plate ("NIPOCS APCF" (trade name) manufactured by Nitto Denko Corporation) with a transmittance of 46.6% as the third polarizing plate. Table 2 shows the properties of the obtained liquid crystal display apparatuses.

The polarizing plate with a retardation plate I was attached to the viewer side of the liquid crystal cell produced in Reference Example 6 via an acrylic pressure-sensitive adhesive (thickness: 20 μm) so that the absorption axis direction of the polarizer was substantially parallel to the longitudinal direction of the liquid crystal cell, and another retardation plate (B) and the liquid crystal cell were opposed to each other. Then, the polarizing plate with a retardation plate II was attached to an opposite side of the liquid crystal cell with respect to the viewer side (backlight side) via an acrylic pressure-sensitive adhesive (thickness: 20 μm) so that the absorption axis direction of the polarizer was substantially perpendicular to the longitudinal direction of the liquid crystal cell, and the retardation plate (A2) and the liquid crystal cell were opposed to each other. At this time, the absorption axis direction of the polarizer of the first polarizing plate and the absorption axis direction of the polarizer of the second polarizing plate are substantially perpendicular to each other. Further, the slow axis direction of the another retardation plate (B) is substan-

TABLE 2

| | | Example 1 | Example 2 | Example 3 | Example 4 | Example 5 | Example 6 | Example 7 | Example 8 |
|---|---|---|---|---|---|---|---|---|---|
| First polarizing plate | Polarizing plate | C | A | B | B | A | A | A | A |
| | $T_1$ (%) | 42.4 | 40.9 | 41.4 | 41.4 | 40.9 | 40.9 | 40.9 | 40.9 |
| Liquid crystal cell | | VA-mode liquid crystal cell | | | | | | | |
| Retardation plate (A1) | | Polyimide | | | | | | | |
| Second polarizing plate | Polarizing plate | D | B | C | D | C | D | B | C |
| | $T_2$ (%) | 42.7 | 41.4 | 42.4 | 42.7 | 42.4 | 42.7 | 41.4 | 42.4 |
| Third polarizing plate | | linearly polarized light separation type reflective polarizing plate | | | | | | | |
| | $T_3$ (%) | 48.0 | 48.0 | 48.0 | 48.0 | 48.0 | 48.0 | 46.6 | 46.6 |
| $\Delta T_{2-1}$ ($T_2 - T_1$ (%)) | | 0.3 | 0.5 | 1.0 | 1.3 | 1.5 | 1.8 | 0.5 | 1.5 |
| $\Delta T_{3-2}$ ($T_3 - T_2$ (%)) | | 5.3 | 6.6 | 5.6 | 5.3 | 5.6 | 5.3 | 5.2 | 4.2 |
| $\Delta T_{3-1}$ ($T_3 - T_1$ (%)) | | 5.6 | 7.1 | 6.6 | 6.6 | 7.1 | 7.1 | 5.7 | 5.7 |
| Contrast | | 1,750 | 1,714 | 1,763 | 1,691 | 1,732 | 1,708 | 1,744 | 1,752 |

Example 9

The polarizing plate C produced in Reference Example 3 was used as the first polarizing plate. A stretched polymer film containing a cyclic olefin-based resin ("ZEONOR film" (tradename); thickness: 60 μm, manufactured by Optes Co., Ltd.) was attached, as another retardation plate (B), to the polarizing plate C via the adhesive composition prepared in Reference Example 7 (thickness of the adhesive layer after drying: 80 nm) so that the absorption axis of the polarizer of the first polarizing plate was substantially perpendicular to the slow axis of the film. Thus, a polarizing plate with a retardation plate I was obtained.

The polarizing plate D produced in Reference Example 4 was used as the second polarizing plate. A stretched polymer film containing a cyclic olefin-based resin ("ZEONOR film" (trade name); thickness: 60 μm, manufactured by Optes Co., Ltd.) was attached, as the retardation plate (A2), to the polarizing plate D via the adhesive composition prepared in Reference Example 7 (thickness of the adhesive layer after drying: 80 nm) so that the absorption axis of the polarizer of the second polarizing plate were substantially perpendicular to the slow axis of the film. Thus, a polarizing plate with a retardation plate II was obtained.

tially perpendicular to the slow axis direction of the retardation plate (A2).

Further, a third polarizing plate (linearly polarized light separation type reflective polarizing plate, "DBEF" (trade name), manufactured by 3M Company) was attached to the laminate thus obtained via an acrylic pressure-sensitive adhesive (thickness: 20 μm) so that the transmission axis direction of the third polarizing plate was substantially parallel to the transmission axis of the above second polarizing plate. The liquid crystal panel thus obtained was combined with a backlight unit of the original liquid crystal apparatus to produce a liquid crystal display apparatus. Table 3 shows the properties of the liquid crystal display apparatus thus obtained.

Examples 10 to 14

Liquid crystal panels and liquid crystal display apparatuses were produced in the same way as in Example 9, except for using polarizing plates shown in Table 3 as the first and second polarizing plates. Table 3 shows the properties of the obtained liquid crystal display apparatuses.

TABLE 3

|  |  | Example 9 | Example 10 | Example 11 | Example 12 | Example 13 | Example 14 |
|---|---|---|---|---|---|---|---|
| First polarizing plate | Polarizing plate | C | A | B | B | A | A |
|  | $T_1$ (%) | 42.4 | 40.9 | 41.4 | 41.4 | 40.9 | 40.9 |
| Another retardation plate (B) |  | Cyclic olefin-based resin | | | | | |
| Liquid crystal cell |  | VA-mode liquid crystal cell | | | | | |
| Retardation plate (A2) |  | Cyclic olefin-based resin | | | | | |
| Second polarizing plate | Polarizing plate | D | B | C | D | C | D |
|  | $T_2$ (%) | 42.7 | 41.4 | 42.4 | 42.7 | 42.4 | 42.7 |
| Third polarizing plate |  | linearly polarized light separation type reflective polarizing plate | | | | | |
|  | $T_3$ (%) | 48.0 | 48.0 | 48.0 | 48.0 | 48.0 | 48.0 |
| $\Delta T_{2-1}$ ($T_2 - T_1$ (%)) |  | 0.3 | 0.5 | 1.0 | 1.3 | 1.5 | 1.8 |
| $\Delta T_{3-2}$ ($T_3 - T_2$ (%)) |  | 5.3 | 6.6 | 5.6 | 5.3 | 5.6 | 5.3 |
| $\Delta T_{3-1}$ ($T_3 - T_1$ (%)) |  | 5.6 | 7.1 | 6.6 | 6.6 | 7.1 | 7.1 |
| Contrast |  | 1,800 | 1,768 | 1,815 | 1,740 | 1,777 | 1,754 |

Comparative Examples 1 to 6

Liquid crystal panels and liquid crystal display apparatuses were produced in the same way as in Example 1, except for using polarizing plates shown in Table 4 as the first and second polarizing plates. Table 4 shows the properties of the obtained liquid crystal display apparatuses.

Comparative Examples 7 to 9

Liquid crystal panels and liquid crystal display apparatuses were produced in the same way as in Example 1, except for using the polarizing plates shown in Table 4 as the first and second polarizing plates and linearly polarized light separation type reflective polarizing plate ("NIPOCS APCF" (tradename) manufactured by Nitto Denko Corporation) with a transmittance of 46.6% as the third polarizing plate. Table 4 shows the properties of the liquid crystal display apparatuses thus obtained.

TABLE 4

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| First polarizing plate | Polarizing plate | C | D | D | C | D | C | D | C | C |
|  | $T_1$ (%) | 42.4 | 42.7 | 42.7 | 42.4 | 42.7 | 42.4 | 42.7 | 42.4 | 42.4 |
| Liquid crystal cell |  | VA-mode liquid crystal cell | | | | | | | | |
| Retardation plate (A1) |  | Polyimide | | | | | | | | |
| Second polarizing plate | Polarizing plate | C | D | A | A | B | B | D | A | B |
|  | $T_2$ (%) | 42.4 | 42.7 | 40.9 | 40.9 | 41.4 | 41.4 | 42.7 | 40.9 | 41.4 |
| Third polarizing plate |  | linearly polarized light separation type reflective polarizing plate | | | | | | | | |
|  | $T_3$ (%) | 48.0 | 48.0 | 48.0 | 48.0 | 48.0 | 48.0 | 46.6 | 46.6 | 46.6 |
| $\Delta T_{2-1}$ ($T_2 - T_1$ (%)) |  | 0 | 0 | -1.8 | -1.5 | -1.3 | -1.0 | 0 | -1.5 | -1.0 |
| $\Delta T_{3-2}$ ($T_3 - T_2$ (%)) |  | 5.6 | 5.3 | 7.1 | 7.1 | 6.6 | 6.6 | 3.9 | 5.7 | 5.2 |
| $\Delta T_{3-1}$ ($T_3 - T_1$ (%)) |  | 5.6 | 5.3 | 5.3 | 5.6 | 5.3 | 5.6 | 3.9 | 4.2 | 4.2 |
| Contrast |  | 1,482 | 1,539 | 1,567 | 1,421 | 1,552 | 1,492 | 1,442 | 1,432 | 1,500 |

Comparative Examples 10 to 17

Liquid crystal panels and liquid crystal display apparatuses were produced in the same way as in Example 9, except for using polarizing plates shown in Table 5 as the first and second polarizing plates. Table 5 shows the properties of the obtained liquid crystal display apparatuses.

TABLE 5

|  |  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|---|
| First polarizing plate | Polarizing plate | C | D | D | C | D | C | B | D |
|  | $T_1$ (%) | 42.4 | 42.7 | 42.7 | 42.4 | 42.7 | 42.4 | 41.4 | 42.7 |

TABLE 5-continued

|  | Comparative Example 10 | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|
| Another retardation plate (B) | | | | Cyclic olefin-based resin | | | | |
| Liquid crystal cell | | | | VA-mode liquid crystal cell | | | | |
| Retardation plate (A2) | | | | Cyclic olefin-based resin | | | | |
| Second polarizing plate | C | D | A | A | B | B | A | C |
| plate $T_2$ (%) | 42.4 | 42.7 | 40.9 | 40.9 | 41.4 | 41.4 | 40.9 | 42.4 |
| Third polarizing plate | | | linearly polarized light separation type reflective polarizing plate | | | | | |
| plate $T_3$ (%) | 48.0 | 48.0 | 48.0 | 48.0 | 48.0 | 48.0 | 48.0 | 48.0 |
| $\Delta T_{2-1}$ ($T_2 - T_1$ (%)) | 0 | 0 | −1.8 | −1.5 | −1.3 | −1.0 | −0.5 | −0.3 |
| $\Delta T_{3-2}$ ($T_3 - T_2$ (%)) | 5.6 | 5.3 | 7.1 | 7.1 | 6.6 | 6.6 | 7.1 | 5.6 |
| $\Delta T_{3-1}$ ($T_3 - T_1$ (%)) | 5.6 | 5.3 | 5.3 | 5.6 | 5.3 | 5.6 | 6.6 | 5.3 |
| Contrast | 1,528 | 1,518 | 1,587 | 1,466 | 1,597 | 1,535 | 1,527 | 1,598 |

Comparative Examples 18 to 23

Liquid crystal panels and liquid crystal display apparatuses were produced in the same way as in Example 1, except for using the polarizing plates shown in Table 6 as the first and second polarizing plates and using no third polarizing plate. Table 6 shows the properties of the liquid crystal display apparatuses thus obtained.

Comparative Examples 24 to 27

Liquid crystal panels and liquid crystal display apparatuses were produced in the same way as in Example 1, except for using the polarizing plates shown in Table 6 as the first and second polarizing plates and using a circularly polarized light separation type reflective polarizing plate ("NIPOCS" (trade name) manufactured by Nitto Denko Corporation) in place of the linearly polarized light separation type reflective polarizing plate as the third polarizing plate. Table 6 shows the properties of the liquid crystal display apparatuses thus obtained.

TABLE 6

|  | Comparative Example 18 | Comparative Example 19 | Comparative Example 20 | Comparative Example 21 | Comparative Example 22 | Comparative Example 23 |
|---|---|---|---|---|---|---|
| First polarizing plate | C | A | B | B | A | A |
| plate $T_1$ (%) | 42.4 | 40.9 | 41.4 | 41.4 | 40.9 | 40.9 |
| Liquid crystal cell | | | VA-mode liquid crystal cell | | | |
| Retardation plate (A1) | | | Polyimide | | | |
| Second polarizing plate | D | B | C | D | C | D |
| plate $T_2$ (%) | 42.7 | 41.4 | 42.4 | 42.7 | 42.4 | 42.7 |
| Third polarizing plate $T_3$ (%) | — | — | — | — | — | — |
| $\Delta T_{2-1}$ ($T_2 - T_1$ (%)) | 0.3 | 0.5 | 1.0 | 1.3 | 1.5 | 1.8 |
| $\Delta T_{3-2}$ ($T_3 - T_2$ (%)) | — | — | — | — | — | — |
| $\Delta T_{3-1}$ ($T_3 - T_1$ (%)) | — | — | — | — | — | — |
| Contrast | 1,432 | 1,492 | 1,498 | 1,442 | 1,525 | 1,469 |

|  | Comparative Example 24 | Comparative Example 25 | Comparative Example 26 | Comparative Example 27 |
|---|---|---|---|---|
| First polarizing plate | B | B | A | A |
| plate $T_1$ (%) | 41.4 | 41.4 | 40.9 | 40.9 |
| Liquid crystal cell | | VA-mode liquid crystal cell | | |
| Retardation plate (A1) | | Polyimide | | |
| Second polarizing plate | C | D | C | D |
| plate $T_2$ (%) | 42.4 | 42.7 | 42.4 | 42.7 |
| Third polarizing plate | | circularly polarized light separation type reflective polarizing plate | | |
| plate $T_3$ (%) | 46.5 | 46.5 | 46.5 | 46.5 |
| $\Delta T_{2-1}$ ($T_2 - T_1$ (%)) | 1.0 | 1.3 | 1.5 | 1.8 |

TABLE 6-continued

|  |  |  |  |  |
|---|---|---|---|---|
| $\Delta T_{3-2}$ ($T_3 - T_2$ (%)) | 4.1 | 3.8 | 4.1 | 3.8 |
| $\Delta T_{3-1}$ ($T_3 - T_1$ (%)) | 5.1 | 5.1 | 5.6 | 5.6 |
| Contrast | 1,481 | 1,427 | 1,506 | 1,453 |

Comparative Examples 28 to 33

Liquid crystal panels and liquid crystal display apparatuses were produced in the same way as in Example 9, except for using the polarizing plates shown in Table 7 as the first and second polarizing plates and using no third polarizing plate. Table 7 shows the properties of the liquid crystal display apparatuses thus obtained.

Comparative Examples 34 to 39

Liquid crystal panels and liquid crystal display apparatuses were produced in the same way as in Example 9, except for using the polarizing plates shown in Table 7 as the first and second polarizing plates and using a circularly polarized light separation type reflective polarizing plate ("NIPOCS" (tradename) manufactured by Nitto Denko Corporation) in place of the linearly polarized light separation type reflective polarizing plate as the third polarizing plate. Table 7 shows the properties of the liquid crystal display apparatuses thus obtained.

TABLE 7

|  | Comparative Example 28 | Comparative Example 29 | Comparative Example 30 | Comparative Example 31 | Comparative Example 32 | Comparative Example 33 |
|---|---|---|---|---|---|---|
| First polarizing plate | C | A | B | B | A | A |
| polarizing plate $T_1$ (%) | 42.4 | 40.9 | 41.4 | 41.4 | 40.9 | 40.9 |
| Another retardation plate (B) | | | Cyclic olefin-based resin | | | |
| Liquid crystal cell | | | VA-mode liquid crystal cell | | | |
| Retardation plate (A2) | | | Cyclic olefin-based resin | | | |
| Second polarizing plate | D | B | C | D | C | D |
| polarizing plate $T_2$ (%) | 42.7 | 41.4 | 42.4 | 42.7 | 42.4 | 42.7 |
| Third polarizing plate $T_3$ (%) | — | — | — | — | — | — |
| $\Delta T_{2-1}$ ($T_2 - T_1$ (%)) | 0.3 | 0.5 | 1.0 | 1.3 | 1.5 | 1.8 |
| $\Delta T_{3-2}$ ($T_3 - T_2$ (%)) | — | — | — | — | — | — |
| $\Delta T_{3-1}$ ($T_3 - T_1$ (%)) | — | — | — | — | — | — |
| Contrast | 1,477 | 1,540 | 1,546 | 1,490 | 1,572 | 1,515 |

|  | Comparative Example 34 | Comparative Example 35 | Comparative Example 36 | Comparative Example 37 | Comparative Example 38 | Comparative Example 39 |
|---|---|---|---|---|---|---|
| First polarizing plate | C | A | B | B | A | A |
| polarizing plate $T_1$ (%) | 42.4 | 40.9 | 41.4 | 41.4 | 40.9 | 40.9 |
| Another retardation plate (B) | | | Cyclic olefin-based resin | | | |
| Liquid crystal cell | | | VA-mode liquid crystal cell | | | |
| Retardation plate (A2) | | | Cyclic olefin-based resin | | | |
| Second polarizing plate | D | B | C | D | C | D |
| polarizing plate $T_2$ (%) | 42.7 | 41.4 | 42.4 | 42.7 | 42.4 | 42.7 |
| Third polarizing plate $T_3$ (%) | | | circularly polarized light separation type reflective polarizing plate | | | |
| | 46.5 | 46.5 | 46.5 | 46.5 | 46.5 | 46.5 |
| $\Delta T_{2-1}$ ($T_2 - T_1$ (%)) | 0.3 | 0.5 | 1.0 | 1.3 | 1.5 | 1.8 |
| $\Delta T_{3-2}$ ($T_3 - T_2$ (%)) | 3.8 | 5.1 | 4.1 | 3.8 | 4.1 | 3.8 |
| $\Delta T_{3-1}$ ($T_3 - T_1$ (%)) | 4.1 | 5.6 | 5.1 | 5.1 | 5.6 | 5.6 |
| Contrast | 1,464 | 1,522 | 1,529 | 1,475 | 1,554 | 1,500 |

Comparative Examples 40 to 41

Liquid crystal panels and liquid crystal display apparatuses were produced in the same way as in Example 1, except for using the polarizing plates shown in Table 8 as the first and second polarizing plates and using no third polarizing plate. Table 8 shows the properties of the liquid crystal display apparatuses thus obtained together with the properties of the liquid crystal display apparatuses obtained in Examples 5 and 6 and Comparative Examples 3, 4, 22, and 23.

TABLE 8

| | Example 5 | | | | Comparative Example 4 | | | |
|---|---|---|---|---|---|---|---|---|
| | First polarizing plate | Second polarizing plate | $\Delta T_{2-1}$ | Third polarizing plate | First polarizing plate | Second polarizing plate | $\Delta T_{2-1}$ | Third polarizing plate |
| | A | C | 1.5 | linearly polarized light separation type | C | A | −1.5 | linearly polarized light separation type |
| Contrast | | 1,732 | | | | 1,421 | | |

| | Comparative Example 22 | | | | Comparative Example 40 | | | |
|---|---|---|---|---|---|---|---|---|
| | First polarizing plate | Second polarizing plate | $\Delta T_{2-1}$ | Third polarizing plate | First polarizing plate | Second polarizing plate | $\Delta T_{2-1}$ | Third polarizing plate |
| | A | C | 1.5 | — | C | A | −1.5 | — |
| Contrast | | 1,525 | | | | 1,505 | | |

| | Example 6 | | | | Comparative Example 3 | | | |
|---|---|---|---|---|---|---|---|---|
| | First polarizing plate | Second polarizing plate | $\Delta T_{2-1}$ | Third polarizing plate | First polarizing plate | Second polarizing plate | $\Delta T_{2-1}$ | Third polarizing plate |
| | A | D | 1.8 | linearly polarized light separation type | D | A | −1.8 | linearly polarized light separation type |
| Contrast | | 1,708 | | | | 1,567 | | |

| | Comparative Example 23 | | | | Comparative Example 41 | | | |
|---|---|---|---|---|---|---|---|---|
| | First polarizing plate | Second polarizing plate | $\Delta T_{2-1}$ | Third polarizing plate | First polarizing plate | Second polarizing plate | $\Delta T_{2-1}$ | Third polarizing plate |
| | A | D | 1.8 | — | D | A | −1.8 | — |
| Contrast | | 1,469 | | | | 1,422 | | |

[Evaluation]

As shown in Examples 1 to 14, a liquid crystal display apparatus having the liquid crystal panel of the present invention includes a retardation plate, and uses a first polarizing plate with a transmittance adjusted, a second polarizing plate, and a third polarizing plate that is a linearly polarized light separation type reflective polarizing plate, thereby exhibiting a remarkably high contrast ratio in a front direction, compared with that of a liquid crystal display apparatus with a conventional liquid crystal panel. It should be noted that in Table 8, for example, as is apparent from the comparison between the difference in a contrast ratio between Comparative Example 22 and Example 5, and the difference in a contrast ratio between Comparative Example 40 and Comparative Example 4, the effects of using the linearly polarized light separation type reflective polarizing plate (DBEF) as the third polarizing plate are remarkably exhibited when the transmittances of the first and second polarizing plates are adjusted appropriately. Further, in Table 8, as is apparent from the comparison between the difference in a contrast ratio between Comparative Example 4 and Example 5, and the difference in a contrast ratio between Comparative Example 40 and Comparative Example 22, the effects of adjusting the transmittances of the first and second polarizing plates are remarkably exhibited when the linearly polarized light separation type reflective polarizing plate is used as the third polarizing plate. More specifically, according to the present invention, due to the synergistic effects of the effects of adjusting the transmittances of the first and second polarizing plates and the effects of using the linearly polarized light separation type reflective polarizing plate as the third polarizing plate, a liquid crystal display apparatus with a remarkably high contrast ratio in a front direction can be obtained.

As described above, the liquid crystal panel of the present invention exhibits a high contrast ratio in a front direction when used in a liquid crystal display apparatus. Therefore, the liquid crystal panel is very useful for enhancing the display properties of a liquid crystal television, a monitor of a personal computer, and a mobile phone.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel, comprising:
a liquid crystal cell;
a first polarizing plate placed on one side of the liquid crystal cell;
a second polarizing plate and a third polarizing plate placed on the other side of the liquid crystal cell in an order starting from a side of the liquid crystal cell; and
a retardation plate (A) placed between the liquid crystal cell and the second polarizing plate,
wherein a refractive index ellipsoid of the retardation plate (A) has a relationship of $nx \geq ny > nz$,
a difference ($\Delta T_{2-1} = T_2 - T_1$) between an entirety of a transmittance ($T_2$) of the second polarizing plate and a transmittance ($T_1$) of the first polarizing plate is larger than 0%,
a difference ($\Delta T_{3-2} = T_3 - T_2$) between an entirety of a transmittance ($T_3$) of the third polarizing plate and a transmittance ($T_2$) of the second polarizing plate is 4.0% to 7.5%,
the third polarizing plate is a linearly polarized light separation type reflective polarizing plate; and
wherein a difference ($\Delta T_{3-1} = T_3 - T_1$) between a transmittance ($T_3$) of the third polarizing plate and a transmittance ($T_1$) of the first polarizing plate is 5.5% to 8.0%.

2. A liquid crystal panel according to claim 1, further comprising another retardation plate (B) whose refractive index ellipsoid has a relationship of $nx \geq ny > nz$ between the liquid crystal cell and the first polarizing plate.

3. A liquid crystal panel according to claim 1, wherein the difference ($\Delta T_{2-1} = T_2 - T_1$) between a transmittance ($T_2$) of the second polarizing plate and a transmittance ($T_1$) of the first polarizing plate is 0.1% to 4.0%.

4. A liquid crystal panel according to claim 1, wherein the difference ($\Delta T_{3-2} = T_3 - T_2$) between a transmittance ($T_3$) of the third polarizing plate and a transmittance ($T_2$) of the second polarizing plate is 4.0% to 7.0%.

5. A liquid crystal panel according to claim 1, wherein the first polarizing plate is placed on a viewer side of the liquid crystal cell, and the second polarizing plate and the third polarizing plate are placed on an opposite side of the liquid crystal cell with respect to the viewer side.

6. A liquid crystal panel according to claim 1, wherein the first polarizing plate includes a first polarizer, the second polarizing plate includes a second polarizer, the third polarizing plate includes a third polarizer, and a transmission axis of the second polarizer and a transmission axis of the third polarizer are substantially parallel to each other.

7. A liquid crystal panel according to claim 6, wherein a slow axis of the retardation plate (A) and an absorption axis of the second polarizer are substantially perpendicular to each other.

8. A liquid crystal panel according to claim 1, wherein the liquid crystal cell includes liquid crystal molecules arranged in a homeotropic alignment.

9. A liquid crystal panel according to claim 1, wherein a thickness direction retardation value (Rth[590]) at a wavelength of 590 nm of the retardation plate (A) is 100 nm to 400 nm.

10. A liquid crystal panel according to claim 1, wherein an Nz coefficient of the retardation plate (A) is more than 1.1 and equal to or less than 8.

11. A liquid crystal panel according to claim 1, wherein the retardation plate (A) contains one of a polyimide-based resin, a norbornene-based resin, a cellulose-based resin, a polycarbonate-based resin, a polypropylene-based resin, an acrylic resin, a polyvinyl acetal-based resin, and a polyester-based resin.

12. A liquid crystal display apparatus, comprising the liquid crystal panel according to claim 1.

13. A liquid crystal panel according to claim 1, wherein the difference ($\Delta T_{2-1} = T_2 - T_1$) between the entirety of the transmittance ($T_2$) of the second polarizing plate and the transmittance ($T_1$) of the first polarizing plate is uniform.

14. A liquid crystal panel according to claim 1, wherein the light transmittance ($T_3$) of the third polarizing plate is 45.5% to 49.9%.

* * * * *